(12) United States Patent
Kroushl et al.

(10) Patent No.: US 10,186,847 B2
(45) Date of Patent: Jan. 22, 2019

(54) MOTOR CONTROL CENTER (MCC) UNITS WITH SLIDABLE SHUTTERS

(71) Applicant: Eaton Intelligent Power Limited, Dublin (IE)

(72) Inventors: Daniel Boyd Kroushl, Clayton, NC (US); Alfred Gregory Beard, Raleigh, NC (US); Edgar Yee, Chapel Hill, NC (US)

(73) Assignee: Eaton Intelligent Power Limited, Dublin (IE)

( * ) Notice: Subject to any disclaimer, the term of this patent is extended or adjusted under 35 U.S.C. 154(b) by 26 days.

(21) Appl. No.: 15/357,700

(22) Filed: Nov. 21, 2016

(65) Prior Publication Data

US 2018/0145486 A1 May 24, 2018

(51) Int. Cl.

| | |
|---|---|
| *H01H 9/22* | (2006.01) |
| *H02B 1/06* | (2006.01) |
| *H02B 1/04* | (2006.01) |
| *H02B 1/26* | (2006.01) |
| *H02B 1/36* | (2006.01) |

(52) U.S. Cl.
CPC .................. *H02B 1/06* (2013.01); *H01H 9/22* (2013.01); *H02B 1/04* (2013.01); *H02B 1/26* (2013.01); *H02B 1/36* (2013.01)

(58) Field of Classification Search
CPC .. H01H 9/22; H01H 3/30; H01H 3/20; H01H 9/20; H01H 33/6661; H01H 21/06; H01H 33/48; H01H 33/52; H02B 1/36; H02B 11/24; H02B 11/127; H02B 11/133; H02B 11/173; H02B 1/38; H02B 1/21; H02B 1/32

USPC ......... 200/50.24, 50.21, 50.26, 50.01, 50.17, 200/50.12, 401, 50.13, 327, 50.02, 50.03, 200/50.23, 50.25, 50.3
See application file for complete search history.

(56) References Cited

U.S. PATENT DOCUMENTS

| | | |
|---|---|---|
| 1,838,898 A | 12/1931 | Aldeen |
| 2,042,886 A | 6/1936 | Ferguson |
| 2,809,085 A | 10/1957 | Fall |
| 2,914,707 A | 11/1959 | Timmerman |
| 2,921,998 A | 1/1960 | Pokorny et al. |
| 3,203,575 A | 8/1965 | Anderson et al. |
| 3,479,104 A | 11/1969 | Kobryner |
| 4,024,441 A | 5/1977 | Coyle et al. |
| 4,086,452 A | 4/1978 | Collins |
| 4,090,230 A | 5/1978 | Fuller et al. |

(Continued)

FOREIGN PATENT DOCUMENTS

| | | |
|---|---|---|
| FR | 2 747 877 | 10/1997 |
| FR | 2 814 321 | 3/2002 |

(Continued)

OTHER PUBLICATIONS

"Arc flash—the threat that is real" *Eaton* Product Aid: Freedom Arc Resistant Motor Control Center (2 pages) (Mar. 2014).

(Continued)

*Primary Examiner* — Ahmed Saeed
(74) *Attorney, Agent, or Firm* — Myers Bigel, P.A.

(57) ABSTRACT

Motor control centers have units or buckets with an operator mechanism with a retractable power stab assembly and one or more sliding shutters that controllably block access to a stab isolation port based on position of the operator disconnect handle using an attached shutter cam that slides the shutter right and left.

20 Claims, 17 Drawing Sheets

(56) References Cited

U.S. PATENT DOCUMENTS

| | | | |
|---|---|---|---|
| 4,206,944 | A | 6/1980 | Kumagai et al. |
| 4,371,223 | A | 2/1983 | Grunert et al. |
| 4,486,815 | A | 12/1984 | Takahashi |
| 4,503,408 | A | 3/1985 | Mrenna et al. |
| 4,754,367 | A | 6/1988 | Bohnen |
| 4,926,286 | A | 5/1990 | Maki et al. |
| 5,343,355 | A | 8/1994 | Ishikawa |
| 5,625,531 | A | 4/1997 | Padilla et al. |
| 5,910,760 | A | 6/1999 | Malingowski et al. |
| 6,031,192 | A | 2/2000 | Liebetruth |
| 6,194,983 | B1 | 2/2001 | Bogdon et al. |
| 6,711,001 | B2 | 3/2004 | Hernandez et al. |
| 7,186,933 | B2 | 3/2007 | Turner |
| 7,420,133 | B2 | 9/2008 | Farrow et al. |
| 7,684,199 | B2 | 3/2010 | Yee et al. |
| 7,688,572 | B2 | 3/2010 | Yee et al. |
| 7,800,888 | B2 | 9/2010 | Morris et al. |
| 7,965,493 | B2 | 6/2011 | Leeman et al. |
| 7,987,555 | B2 | 8/2011 | Chen et al. |
| 8,108,971 | B2 | 2/2012 | Florek |
| 8,199,022 | B2 | 6/2012 | Morris et al. |
| 8,243,422 | B2 | 8/2012 | Leeman et al. |
| 8,248,761 | B2 | 8/2012 | Leeman et al. |
| 8,305,736 | B2 | 11/2012 | Yee et al. |
| 8,511,510 | B2 | 8/2013 | Pratte et al. |
| 8,537,518 | B2 | 9/2013 | Morris et al. |
| 8,590,106 | B2 | 11/2013 | Lu |
| 8,817,454 | B2 | 8/2014 | Morris et al. |
| 8,934,218 | B2 | 1/2015 | Morris |
| 9,153,947 | B2 | 10/2015 | Fleitmann et al. |
| 9,451,718 | B2 | 9/2016 | Oneufer et al. |
| 9,531,169 | B2 | 12/2016 | Oneufer et al. |
| 2008/0022673 | A1 | 1/2008 | Morris et al. |
| 2008/0023211 | A1 | 1/2008 | Yee et al. |
| 2008/0258667 | A1 | 10/2008 | Morris et al. |
| 2009/0086414 | A1 | 4/2009 | Yee et al. |
| 2013/0077210 | A1 | 3/2013 | Morris |
| 2013/0088812 | A1 | 4/2013 | Yee et al. |
| 2014/0362498 | A1 | 12/2014 | Morris et al. |
| 2015/0103472 | A1 | 4/2015 | Oneufer et al. |
| 2015/0221458 | A1 | 8/2015 | Oneufer et al. |
| 2015/0380910 | A1 | 12/2015 | Oneufer et al. |
| 2015/0382492 | A1 | 12/2015 | Oneufer et al. |
| 2017/0063056 | A1 | 3/2017 | Oneufer et al. |

FOREIGN PATENT DOCUMENTS

| | | |
|---|---|---|
| JP | S 59-9459 U | 1/1984 |
| JP | 2011-234542 A | 11/2011 |
| WO | WO 2015/047236 A1 | 4/2015 |

OTHER PUBLICATIONS

International Search Report and the Written Opinion of the International Searching Authority corresponding to International Patent Application No. PCT/US2017/057802 (15 pages) (dated Jan. 19, 2018).

"Centerline® 2100 SecureConnect™: Help Reduce Exposure to Electrical Shock and Hazards" *Product Information Sheet, Allen-Bradley* www.rockwellautomation.com(4 pages) (2017).

"Evolution E9000* MCC with AFM Arc Flash Mitigation Units for Low-Voltage Motor Control" *Fact Sheet, GE Industrial Solutions* (2 pages) (2014).

International Search Report and the Written Opinion of the International Searching Authority corresponding to related International Patent Application No. PCT/US2017/057795 (13 pages) (dated Jan. 25, 2018).

Drawings/Views of internal components of an MCC (FLASHGARD) unit sold by Eaton, Inc. at least as early as 2012 (6 pages).

MOTOR CONTROL CENTER (MCC) UNITS WITH SLIDABLE SHUTTERS

FIELD OF THE INVENTION

The present invention relates to motor control systems and more particularly to motor control center units.

BACKGROUND OF THE INVENTION

As is known to those of skill in the art, a Motor Control Center (MCC) can include cabinets or enclosures that hold multiple, typically modular, bucket assemblies of various sizes. See, e.g., U.S. Pat. No. 4,024,441, the contents of which are hereby incorporated by reference as if recited in full herein. Eaton Corporation has recently introduced a MCC product line with compact bucket assemblies that conveniently plug into a slot or space in an MCC cabinet. The product is sold under the product name, Freedom 2100 MCC. See also, U.S. Patent Application Publication Serial Number US2013/0077210, the contents of which are hereby incorporated by reference as if recited in full herein.

MCCs are used, for example, in some commercial and industrial applications to distribute electrical power to a variety of loads (e.g., without limitation, relatively high power electrical motors, pumps, and other loads).

The bucket assemblies (also known as "buckets" or "units") can include handles that are disposed on the front door. See, e.g., U.S. Pat. Nos. 6,194,983 and 7,186,933, the contents of which are incorporated by reference as if recited in full herein. The handle is typically mounted parallel with the plane of the faceplate of the molded case circuit breaker, but spaced outwardly from it by the depth of the handle mechanism.

FIG. 1, for example, shows a portion of a prior art motor control center 100. The motor control center 100 includes a multi-compartment enclosure 12 for receiving a plurality of motor control units 10. Typically, each bucket 10 is a removable, pull-out unit that has a respective door 22 (which may be under a front panel). The door 22 is typically coupled to the housing 12 by hinges 28 (shown in phantom line drawing in FIG. 1) to permit access to motor control components of the bucket 10 while it is installed in the enclosure 12. For example and without limitation, the door 22 permits access to a disconnect circuit assembly 30, a stab indicator 32, a shutter indicator 34, and a line contact actuator 36. When the bucket 10 is fully installed and electrically connected, a user-operator may operate a disconnect handle 20h. In a de-energized state of the motor control center 100, the user-operator may operate an isolation feature by moving a slide 140 and inserting crank 42 through an access portal or hole 43 in the door 22 to access the line contact actuator 36 to move a number of electrical connectors with line contacts (see, for example, stab contacts "S" or 46, 48, 50 of the prior art bucket 10 of FIG. 2) to an isolated position out of (see FIG. 2) electrical contact with power lines or buses of the motor control center 100. Motor control centers and units therefore (also sometimes called "subunits") are described in greater detail, for example, in commonly assigned U.S. Patent Application Publications 2009/0086414, 2008/0258667, 2008/0023211 and 2008/0022673, which are hereby incorporated herein by reference Despite the above, there remains a need for alternate bucket configurations.

SUMMARY OF EMBODIMENTS OF THE INVENTION

Embodiments of the invention provide units with an operator handle that can cooperate with an internal sliding shutter to prevent access to a portal for an isolation feature and can be attached to an internal cam that engages a pivot plate that is attached to a lever of a breaker and move the lever in response to movement of the operator handle between ON and OFF positions. The portal can allow a user-operator to insert a device through an access portal and into a socket, typically a hand crank, to retract or extend stabs in the units.

Embodiments of the invention are directed to a bucket assembly that includes a unit housing having a front and opposing laterally spaced apart sidewalls extend rearward of the front of the unit housing. The bucket assembly also includes an operator handle facing the front of the unit housing. The operator handle moves vertically between first and second positions. The bucket assembly further includes a laterally extending shaft attached to the operator handle and residing inside the unit housing; an upwardly extending shutter linkage that is attached to the laterally extending shaft; a shutter cam attached to the shutter linkage; and a shutter in communication with the shutter cam, wherein the shutter has a shutter portal, and wherein the shutter cooperates with the shutter cam to laterally slide the shutter to a position that misaligns the shutter portal with a lead screw to block access to the lead screw when the operator handle is in the second position.

The shutter can include first and second spaced apart outwardly projecting tabs with the shutter cam positioned therebetween.

The shutter cam can have a cam perimeter profile with a curved segment and a spaced apart peak or node segment. The first tab can reside adjacent the curved segment and the second tab can reside adjacent the peak or node segment.

The shutter portal can have a perimeter shape with an arcuate upper end that merges into a wider open lower end. The shutter cam can be a plate that is held by a laterally extending segment of the shutter and can be parallel to a primary body of the shutter.

The shutter can have a primary body that merges into a lateral extension with a shorter height than the primary body that comprises first and second outwardly projecting tabs. The unit housing can hold a partial front internal wall that terminates above the shaft of the handle. The shutter cam can reside adjacent and between the first and second tabs. A right side of the shutter cam can be spaced apart from the first tab while a left side of the shutter cam contacts the second tab to laterally slide the shutter left and the left side of the shutter cam can be spaced apart from the second tab while the right side of the shutter cam contacts the first tab to laterally slide the shutter right.

The shutter cam can have an upper end that resides above the first and second tabs and a lower end portion that can be pivotably attached to the partial wall behind the partial wall below the tabs.

The bucket assembly can also include a plate that at least partially surrounds the laterally extending shaft and is in a plane that is orthogonal to a longitudinal axis of the laterally extending shaft. The plate can have an inner segment that extends into the bucket assembly and holds a bracket that is attached to a lower end of the shutter linkage with an attachment member. The attachment member can have a centerline that is parallel to the longitudinally extending centerline of the shaft. The attachment member centerline can be a distance from 0.25 to 1.5 inches from the longitudinally extending centerline of the laterally extending shaft.

The shutter can have a primary body that is planar and vertically oriented that resides in front of a metal partial internal front wall with a side extension. The side extension can hold laterally spaced apart outwardly projecting first and second tabs. The shutter cam can reside between the first and second tabs.

The handle assembly link can include a planar plate attached to the laterally extending shaft and can have an extension that holds a bracket with an attachment member that attaches the shutter linkage. The bracket can rotate with the laterally extending shaft as the handle moves up and down to move the shutter linkage that then rotates the shutter cam which moves the shutter laterally.

The shutter cam can be a curvilinear plate that is parallel to a primary body of the shutter.

The bucket assembly can include a support member attached to a primary surface of the shutter cam that resides below outwardly projecting tabs of the shutter, a first fixation member extending through the shutter cam and the support member to attach to a partial front metal wall in the bucket assembly, and a second fixation member extending through the shutter cam and the support member and attached to an upper end portion of the shutter linkage.

The bucket assembly can include a retractable power stab assembly held by the unit housing to extend and retract power stabs from the rear of the unit, an internal lead screw having a portal that is above the handle adjacent the front panel and extends behind the shutter, wherein the shutter portal slides laterally to block access to the lead screw when the operator handle is in the second position.

The bucket assembly can further include: a cam attached to the laterally extending shaft to rotate about a common axis as the operator handle, the cam laterally spaced apart from the handle assembly linkage also attached to the shaft; an inwardly extending linkage having longitudinally opposing spaced apart first and second end portions, the first end portion attached to the cam; a pivot plate attached to the second end portion of the linkage, the pivot plate comprising a laterally extending segment that resides behind the operator handle; and a switch assembly comprising a lever that engages the laterally extending segment of the pivot plate. An upper end portion of a sidewall of the pivot plate can be attached to the second end portion of the linkage and a lower end portion of the sidewall of the pivot plate is slidably attached to a horizontally extending channel held by or formed in a sidewall of a body of the switch assembly.

Other embodiments are directed to buckets that include: a metal internal partial front panel; an operator handle that moves vertically up and down between first and second positions; a laterally extending shaft residing behind and attached to an inner end portion of the operator handle; a cam attached to the shaft to rotate about a common axis as the operator handle; an inwardly extending linkage having longitudinally opposing spaced apart first and second end portions, the first end portion attached to the cam; a pivot plate attached to the second end portion of the linkage, the pivot plate having a laterally extending segment that resides behind the operator handle; a switch assembly comprising a lever that engages the laterally extending segment of the pivot plate; and a retractable power stab assembly with an internal lead screw and access portal. The lead screw cooperates with a nut to extend and retract power stabs from a rear of the bucket. The bucket also includes an inwardly extending handle link attached to the shaft laterally spaced apart from the cam; an upwardly extending shutter linkage that is attached to the handle assembly link; a shutter cam attached to the shutter linkage and the partial front panel; and a shutter in communication with the shutter cam. The shutter has a shutter portal that is aligned with a lead screw when the operator handle is in the first position, and wherein the shutter cooperates with the shutter cam to laterally slide to a position that misaligns the shutter portal with the lead screw to block access to the lead screw when the operator handle is in the second position.

The shutter can include first and second spaced apart outwardly projecting tabs with the shutter cam positioned therebetween.

The shutter cam can have a cam perimeter profile with a curved segment and a spaced apart peak or node segment. The first tab can reside adjacent the curved segment and the second tab can reside adjacent the peak or node segment.

The shutter cam can be a plate that is parallel to a primary body of the shutter.

The shutter portal can have a perimeter shape with an arcuate upper end that merges into a wider open lower end. The shutter cam can be a plate that is held by a laterally extending segment of the shutter and is parallel to a primary body of the shutter.

The shutter can have a primary body with a lateral extension with a shorter height than the primary body that comprises first and second outwardly projecting tabs. The front partial internal front wall extends down a distance and terminates above the shaft of the handle. The shutter cam resides adjacent and between the first and second tabs. A right side of the shutter cam can be spaced apart from the first tab while a left side of the shutter cam contacts the second tab to laterally slide the shutter left and the left side of the shutter cam can be spaced apart from the second tab while the right side of the shutter cam contacts the first tab to laterally slide the shutter right. The shutter cam can have an upper end that resides above the first and second tabs.

The bucket can also include a plate that at least partially surrounds the laterally extending shaft and is in a plane that is orthogonal to a longitudinal axis of the laterally extending shaft. The plate can have an inner segment with a maximal length that extends into the bucket assembly a distance of from 0.5 inch to 2 inches beyond the longitudinally extending centerline of the shaft. The inner segment can hold a bracket that is attached to the shutter linkage.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 7 shows the shutter positioned with a shutter portal providing access to the lead screw while FIG. 8 shows the shutter translated to block access according to embodiments of the present invention.

DETAILED DESCRIPTION OF EMBODIMENTS OF THE INVENTION

Figure 1:
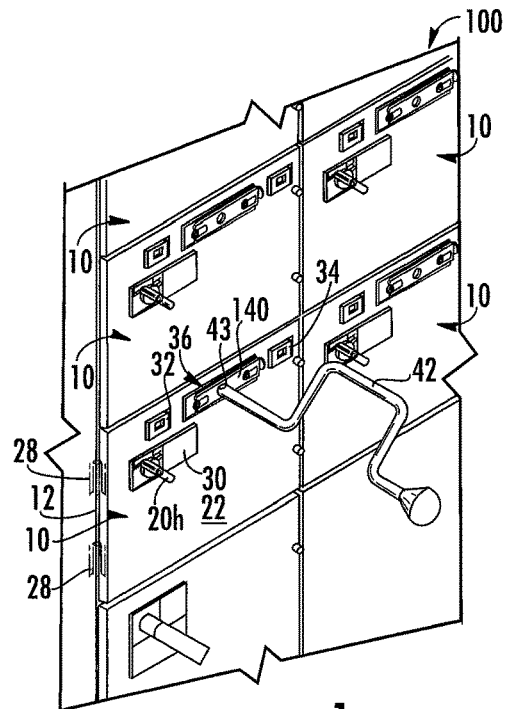
FIG. 1 is a partial front perspective view of an exemplary prior art Motor Control Center (MCC).

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

The term "FIG." (whether in all capital letters or not) is used interchangeably with the word "Figure" as an abbreviation thereof in the specification and drawings. In the figures, certain layers, components or features may be exaggerated for clarity, and broken lines illustrate optional features or operations unless specified otherwise. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In the present disclosure, the terms "bucket" or "unit" are used interchangeably and are intended to mean a motor control center unit that may be configured to be a removable modular unit capable of being installed behind individual or combined sealed doors on the motor control center enclosure. The unit may contain various motor control and motor protection components such as motor controllers, starters, contactor assemblies, overload relays, circuit breakers, motor circuit protectors, various disconnects, and similar devices for electric motors. The unit is configured to connect to a common power bus of the motor control center and conduct supply power to the line side of the motor control devices for operation of motors or feeder circuits.

Figure 2:
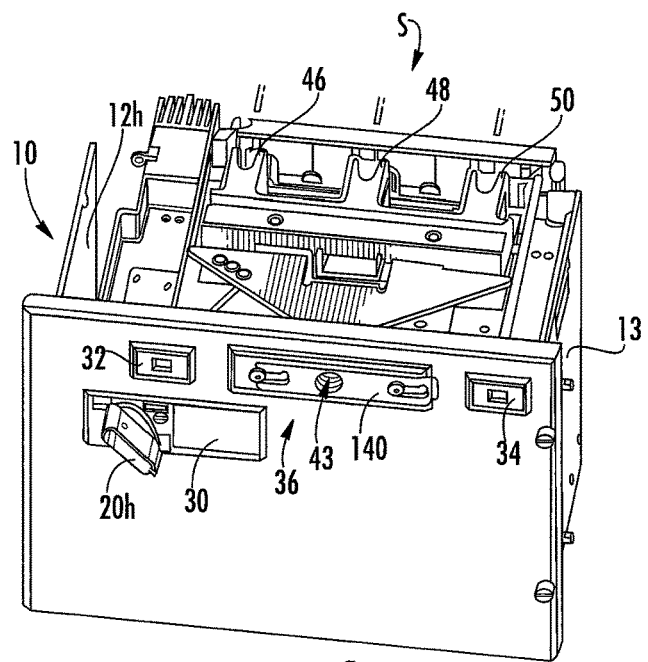
FIG. 2 is a top perspective view of an example of a prior art unit of the MCC.

As discussed before, units may be configured as "starter units" for supplying power to and/or controlling electrical motors and pumps or as general "feeder units" for supplying feeder circuits. The terms "bucket assembly", bucket" and "unit" are used interchangeably and refer to a structure (typically having sides of a protective metal shell) that contains either a switch with a fuse or a circuit breaker for turning power ON and OFF to a motor, or feeder circuit, typically for controlling power to motor starters. As noted above, the bucket or unit can be a feeder unit or a starter unit. The bucket can include other components such as a power transformer, a motor starter to control a single motor and PLCs (programmable logic controllers), drives and the like. The bucket can be configured as a modular device to allow the internal components to be assembled as a unit that can be easily installed into a Motor Control Center (MCC) compartment. As is well known, the bucket 10 can have a bus grid with power stabs "S", shown as three power connectors 46, 48, 50 (FIG. 2) that can extend out of the back of the bucket 10 that connect to bus bars that carry power (current) to the compartments of a vertical section in an MCC cabinet 100 (FIG. 1). The bus bars are connected to larger horizontal bus bars that bring power to the vertical sections. The horizontal bus bars are usually in the top, but some MCC designs may have them in the center or bottom.

A "feeder unit" refers to a motor control center unit for supplying feeder circuits. A feeder unit may have one or more feeders or power supply lines to supply feeder circuits or devices. A feeder unit (also called a "feeder") can have a "line side", which refers to the side of the feeder configured to be directly or indirectly connected to the common power bus of the motor control center. A feeder can also have a "load side", which refers to the side of the feeder configured to be connected to and deliver current to a feeder circuit. A feeder may comprise a circuit breaker, a fuse and disconnect switch, or another configuration. The terms "feeder circuit" and "feeder device" are used interchangeably and are intended to mean circuits or devices connected to feeder units or "feeders".

A disconnect switch such as a "circuit breaker", "breaker", "disconnect switch and fuse", "molded case circuit breaker", "MCCB" are devices designed to open and close a circuit, typically allowing both manual open and close operation and automatic circuit interruption, the latter to open a circuit under certain conditions, e.g., an overcurrent. The disconnect switch can be for a motor starter unit or feeder unit, for example.

The terms "motor", "load", and "load device" are used interchangeably and are intended to mean devices bearing electrical load that are connected to and controlled by the motor control center. Load devices are typically motors but may also be pumps or other machinery that may comprise motors or pumps. Load devices may be connected to starter units.

The terms "operating mechanism" and "operator mechanism" are used interchangeably and refer to an assembly for moving contacts in a switching mechanism between first and second positions in a circuit and/or for opening and closing separable main contacts, in a disconnect circuit such as a circuit breaker or for turning power ON and OFF using a switch associated with a fuse as a disconnect.

MCCs usually have a wire way for wires from respective units 10 to the motors and other loads and control wires. U.S. Patent Application Publication 2013/0077210 describes an MCC with both right and left side wireways, the contents of which are hereby incorporated by reference as if recited in full herein. The wireways are typically provided as an enclosed space in an MCC cabinet proximate but outside stacked units. MCCs can be configured in many ways. Each compartment can have a different height to accept different frame sizes of respective bucket assemblies or units 10, typically in about 6-inch increments. The vertical bus can be omitted or not run through the full height of the section to accommodate deeper buckets for larger items like variable frequency drives. The MCC can be a modular cabinet system for powering and controlling motors or feeder circuits. Several may be powered from main switchgear which, in turn, gets its power from a transformer attached to the incoming line from the power company. A typical MCC cabinet is an enclosure with a number of small doors arranged in rows and columns along the front. The back and sides are typically flat and mostly featureless. The buckets can be provided in varying sizes. For starter units, the size can be based on the size of the motor they are controlling. The bucket assembly can be configured to be relatively easily removable for repair, service or replacement. MCCs can have regular starters, reversing starters, soft start, and variable frequency drives. MCCs can be configured so that sections can be added for expansion if needed. The buckets or units 10 of a motor control center 100 can have the same or different configurations.

Figure 3:
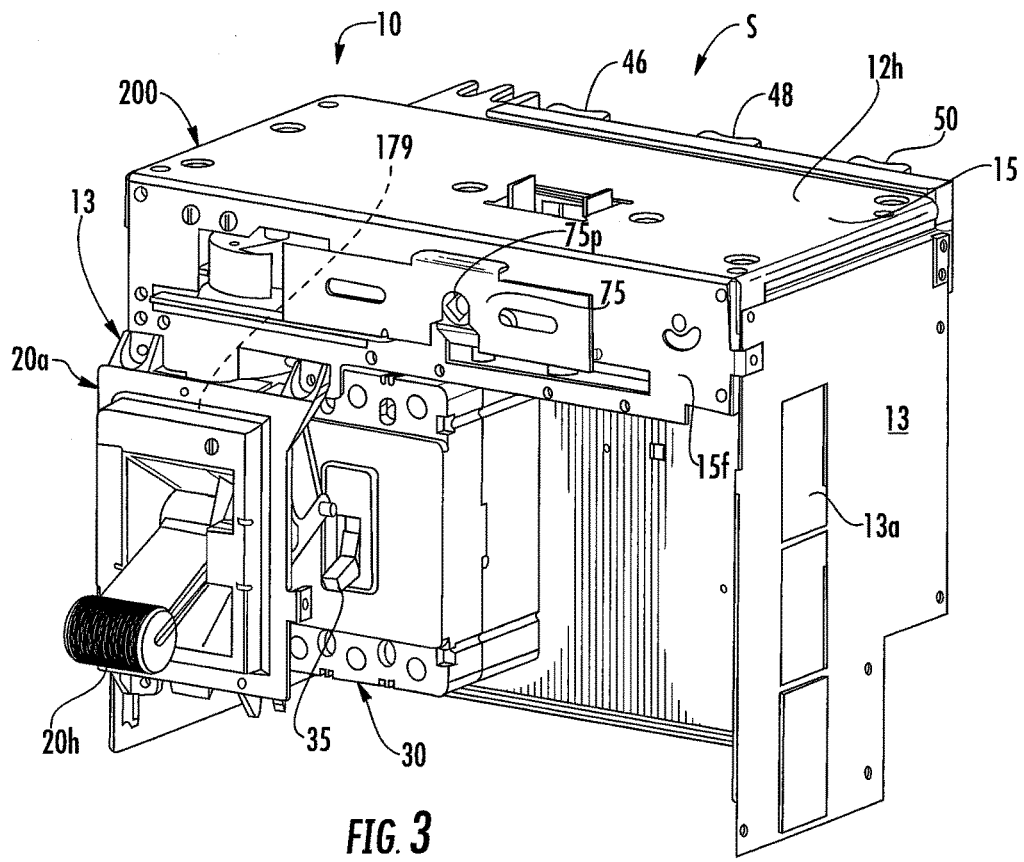
FIG. 3 is a front perspective view of an exemplary unit according to embodiments of the present invention.

The terms "right side" and "left side" refer when the unit or MCC is viewed from the front, e.g., the front is associated with the unit 10 orientation shown in FIG. 3, for example, with the handle 20*h* facing forward and the disconnect connectors 46, 48, 50 facing rearward as shown.

The term "compact" refers to units 10 held in a condensed configuration (package) relative to conventional units/buckets. The MCC structure or cabinet 100 (FIG. 1) can be designed to receive multiple bucket units 10 ranging in various defined sizes. The units 10 can be provided in package or frame sizes of about 6 inches to about 72 inches (tall) with substantially common depth and width dimensions, known as 1X (6 inches) to 12X (72 inches) sizes. The sizes can be in single X increments, from 1X, 2X, 3X, 4X, 5X, 6X, 7X, 8X, 9X, 10X, 11X and 12X. Thus, a 5X MCC unit 10 can be about 30 inches tall. The frame sizes can be provided for a plurality of amperages, including a plurality of: 125 A, 150 A, 225 A, 250 A, 400 A, 600 A, 1200 A and 2000 A, for example. A unit 10 is typically about 7 inches deep but larger or smaller sizes may be appropriate in some embodiments.

Referring to FIG. 3, the unit 10 can have a handle assembly 20*a* with a handle 20*h* that communicates with an internal shutter 75 residing adjacent, and typically above, the handle 20*h*. The term "handle" with respect to the operator handle input can interchangeably referred to as a "handle lever" herein. The handle 20*h* can be a vertical handle that moves up and down between first and second positions, typically ON and OFF positions associated with conduction and non-conduction, respectively. It is noted that the exemplary unit 10 is shown as a single feed, but may be a dual feed configuration, typically in side by side arrangements, but it is contemplated that vertically aligned handles 20*h* may also or alternatively be used with the respective circuits/switch assemblies 30 placed in the unit accordingly.

As shown in FIGS. 3 and 4A-4C, the bucket assembly or unit 10 includes a handle assembly 20*a* that cooperates with the shutter 75 and an operator mechanism 40 that engages the lever/toggle 35 of the switch assembly 30. The unit 10 also includes a retractable power connector assembly 200 with a lead screw 143 as will be discussed further below. The bucket assembly 10 can be configured for DC (direct current) or AC (alternating current) operation.

Figure 4A:
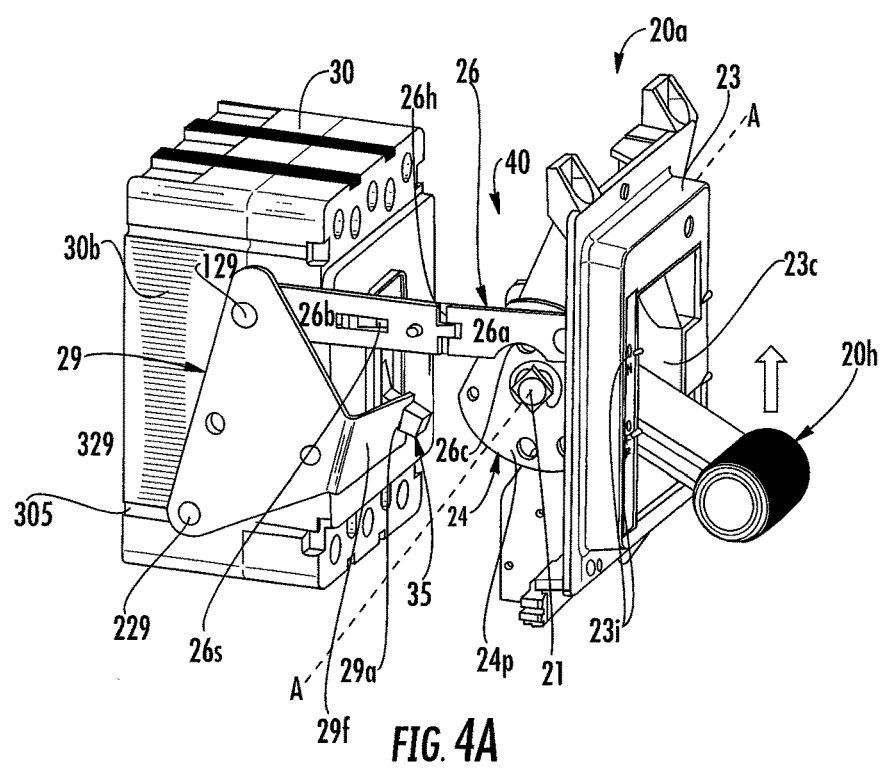
FIGS. 4A-4C are partial side perspective views of exemplary "ON" (FIG. 4A), "OFF" (FIG. 4B) and optional "TRIP" (FIG. 4C) operational positions of the handle assembly shown in FIG. 3 for the associated internal disconnect according to embodiments of the invention.
Figure 4B:
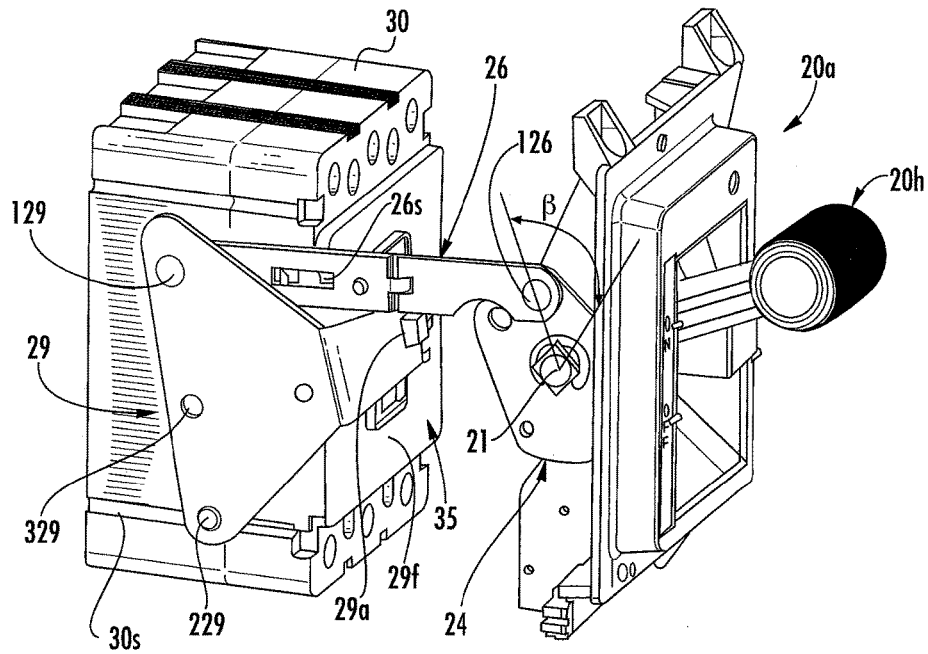
Figure 4C:
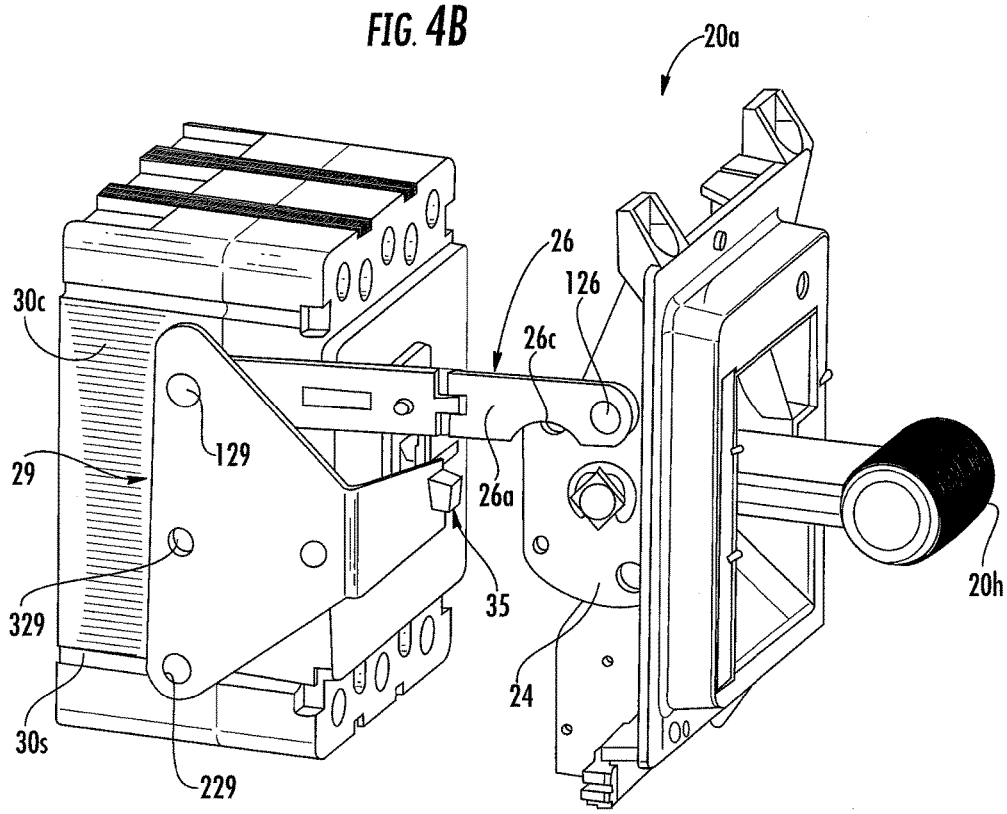
Figure 10:
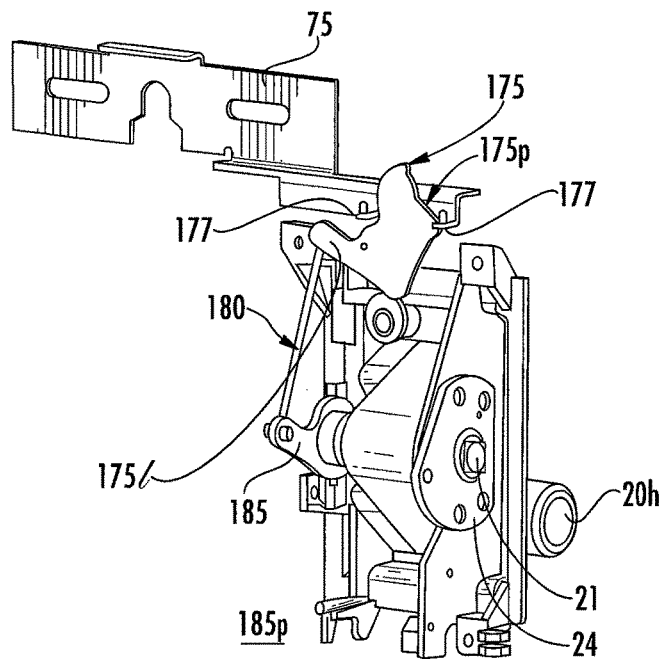
FIG. 10 is a rear side perspective view of a shutter assembly according to embodiments of the present invention.

The handle assembly 20*a* can include a front cover plate 23 (which may also be referred to as a "housing") with a channel 23*c* that allows the handle lever 20*h* to pivot up and down between first and second positions, typically, but not limited to, ON and OFF positions. The front cover plate 23 can include visual indicia 23*i* (i.e., text) identifying the position of the handle 20*h* relative to the first and second positions of the switch (i.e., ON, OFF status) of the unit 10. The handle assembly 20*a* can include an internal cam 24, such as a shaped cam plate 24*p* that is attached to the handle 20*h* via a shaft 21. The shaft 21 can be orthogonal to the cam 24 and the handle lever 20*h* so that the handle lever 20*h* rotates along a common axis A-A with the cam plate 24. As shown in FIGS. 4A-4C, the cam plate 24*p*, pivot plate 29 and linkage 26 may be conventional components used in known buckets 10 with the handle assembly 20*a* modified as shown in FIGS. 3 and 10, for example, and other figures as will be discussed further below.

The operator mechanism 40 can include a linkage 26 that is attached to the cam 24. The cam 24 can be attached to the linkage 26 via attachment member 126 that can reside on an upper end portion of the cam 24 above the shaft 21. The linkage 26 can extend horizontally inward and attach to a pivot plate 29 using an attachment member 129. The pivot plate 29 engages the lever 35 of the disconnect switch assembly 30 to move the lever 35 between first and second positions, i.e., between ON and OFF positions.

The linkage 26 can have an end portion that has an arcuate (curved) shape 26*c* that faces the shaft 21. The linkage 26 can comprise cooperating first and second links 26*a*, 26*b* which may be hingeably attached at hinge 26*h*. The innermost link 26*b* can comprise a slot 26*s* and the other link 26*a* can comprise the arcuate segment 26*c*. The slot 26*s* can engage safety interlocks that can engage sidewalls 13 of the metal enclosure 12*h*.

The pivot plate 29 can be attached to a horizontally extending channel 30*s* via attachment member 229. The attachment member 229 moves straight forward and rearward in the channel 30*s* in response to the opposite movement (rearward and forward movement) of the linkage 26. The channel 30*s* may be a slot directly formed in the sidewall of the body 30*b* or may be provided by a pair of rails or other members held by the (disconnect) switch assembly 30, typically at a lower sidewall of the body 30*b*. The pivot plate 29 can be attached to the sidewall 13 (FIG. 3) of the bucket 10 via attachment member 329 to allow a pivoting motion of the pivot plate 29 relative to the sidewall 13.

The pivot plate 29 can have a side portion that merges into a front portion 29*f* that has a laterally extending front segment that may extend a partial distance over the front of the body 30*b* of the disconnect switch assembly 30 to engage the lever 35. The laterally extending front segment 29*f* can have an aperture 29*a* with upper and lower segments extending about the aperture 29*a*. The lever 35 extends through the aperture 29*a* a distance for secure engagement. The front segment 29*f* may alternatively extend entirely across the front of the body 30*b* (not shown). The aperture 29*a* can be an open gap or window or an open or closed slot in the wall of the laterally extending front segment 29*f*.

As shown in FIGS. 4A and 4B, lifting the handle lever 20*h* up from the first position a sufficient distance causes the cam 24 to rotate counterclockwise and push the lever 35 from the first position to the second position (typically from the OFF to the ON position). In the reverse, rotating the handle lever 20*h* down from the second position to the first position causes the lever 35 to rotate down to the first position. As shown in FIGS. 4A and 4B, the cam 24 can rotate at an angle "3" that is between about 30-45 degrees to move the linkage 26 inward a distance to pivot the pivot plate 29 upward to move the lever 35 upward to the second position (i.e., the ON position).

Figure 5:
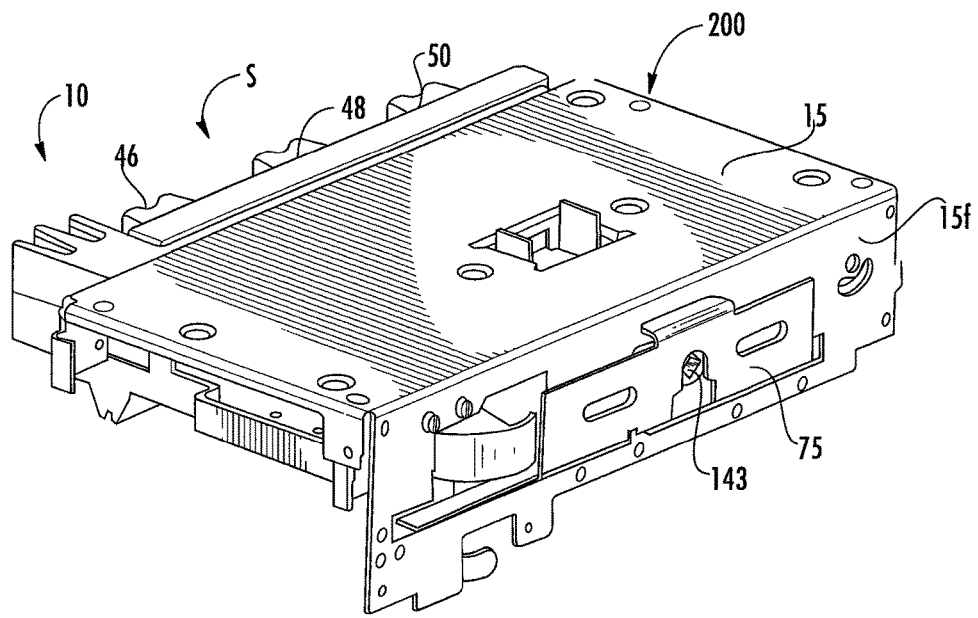
FIG. 5 is a front, side perspective view of a unit with a retractable power connector assembly and internal slidable shutter with the external cover over the racking (stab isolation) portal omitted according to embodiments of the present invention.
Figure 7:
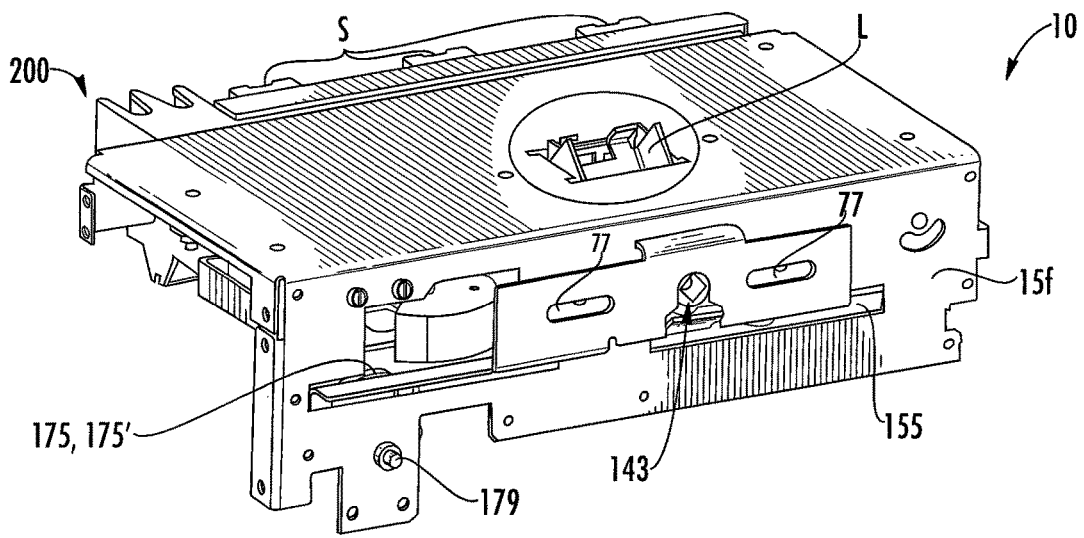
FIGS. 7 and 8 are front, side perspective views of a portion of a unit with a sliding shutter according to embodiments of the present invention.

As shown in FIGS. 3, 5, and 7, for example, the bucket assembly 10 can have a metal enclosure, frame or housing 12*h* with sidewalls 13, and a metal ceiling 15. The metal ceiling can extend down in a front direction to form a partial internal front upper wall 15*f* (the metal ceiling and partial front wall can also be referred to as a "top wrapper") that resides in front of the disconnect operator mechanism 40 and in front of the lever 35 of the disconnect circuit assembly 30. The partial front wall 15*f* can be a shaped front internal partial wall as an extension of the top or may be attached to the top as a separate component.

The shutter cam 175 can slidably attach to the partial front panel 15*f* and be in communication with at least one laterally slidable shutter 75 with a portal 75*p*. When the portal 75*p* is aligned with the isolation portal 43 and an internal lead screw with a socket 143 (FIGS. 6A, 6B) external access to the portal 43 (FIG. 1, 9B) and the lead screw with socket 143 is allowed as will be discussed further below.

As shown in FIG. 5, the unit 10 can comprise a retractable power connector assembly 200 which allows the operator to extend and retract the power connects 46, 48, 50 by rotating a lead screw 143. In order for the bucket 10 to be either installed into or removed from the cabinet 100, the power connectors 46, 48, 50 must be in the retracted position which isolates the bucket 10 from the bus bars. See, U.S. Pat. No. 7,668,572, the contents of which are hereby incorporated by reference as if recited in full herein. The unit 10 also includes the slidable shutter 75 with a portal 75p that can block external access to the lead screw 143.

Figure 6A:
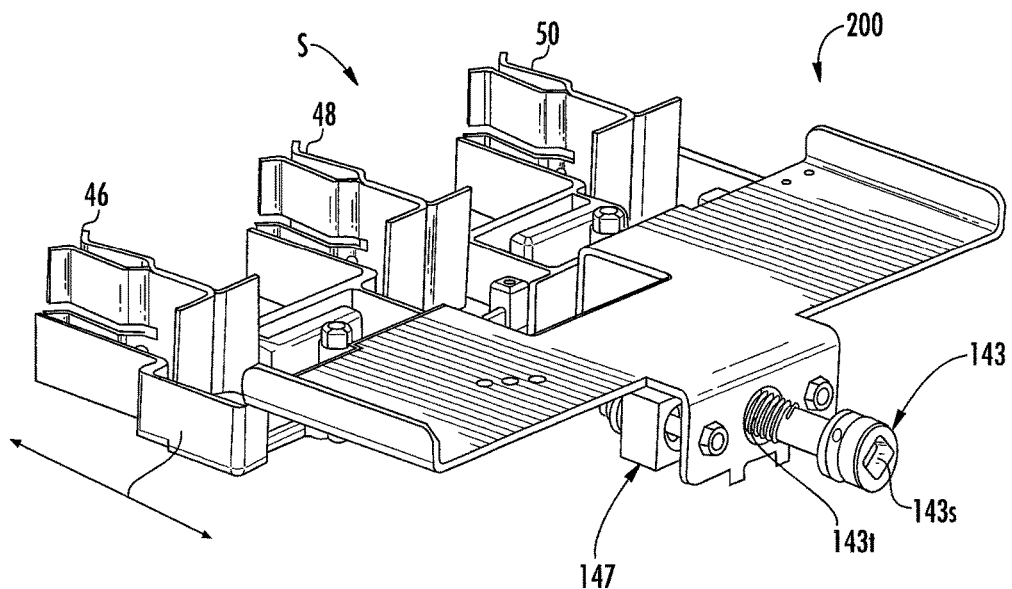
FIGS. 6A and 6B are front, side perspective views of the unit shown in FIG. 5 without the top cover illustrating a retractable stab configuration (FIG. 6A shows them partially retracted and FIG. 6B shows them fully extended) according to embodiments of the present invention.
Figure 6B:
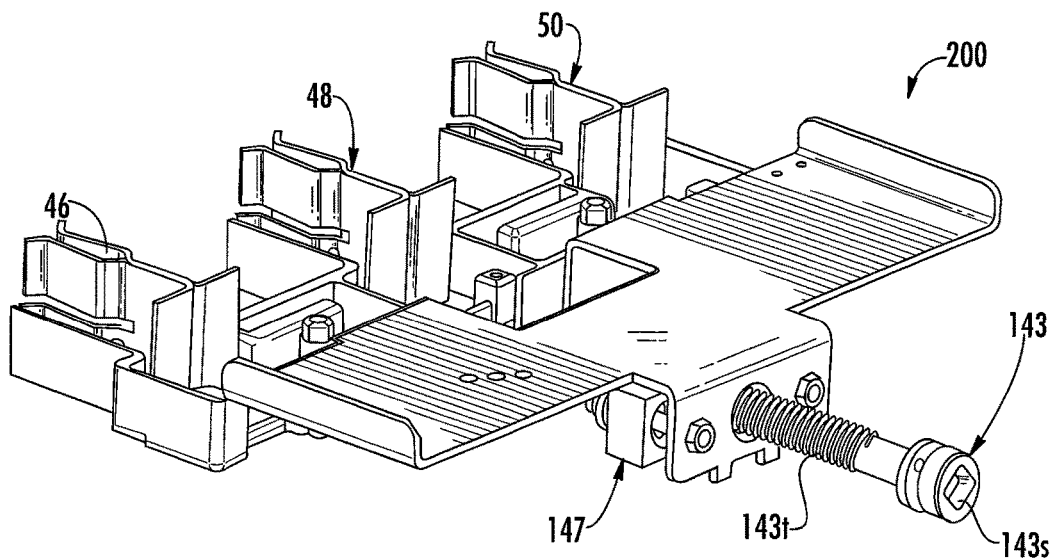

FIG. 6A shows a partially retracted position of the stabs S, i.e., power connectors 46, 48, 50, and FIG. 6B illustrates a fully extended position to illustrate the operation of extending the power connectors 46, 48, 50. A lead screw with a socket 143 is rotated clockwise which drives a nut 147 which is part of the assembly 200 that contains the power connectors 46, 48, 50 In the retracted position, the connectors 46, 48, 50 are not in contact with the bus bars (not shown). If the lead screw 143 with threaded shaft 143t and socket 143s continues to be rotated clockwise the power connectors 46, 48, 50 will eventually come into contact with the bus bars (not shown) when fully extended (FIG. 6B).

Figure 8:
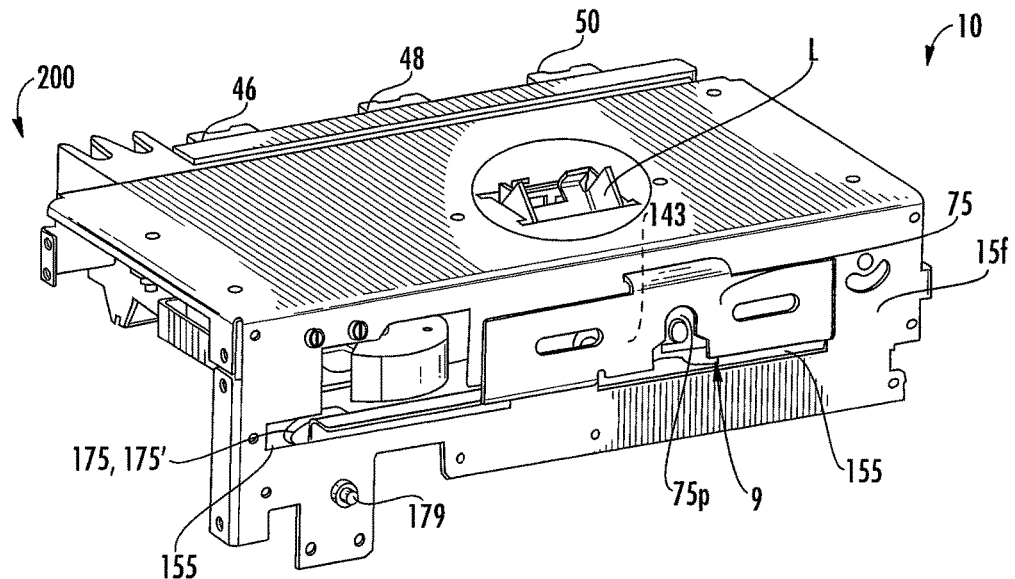

The sliding shutter 75 provides a safety interlock to prevent the operator from accessing the lead screw socket 143s when the breaker 30 is in the ON state. When the disconnect switch assembly 30 (i.e., breaker) is in the OFF state the shutter 75 positions the shutter portal 75p over the socket 143s permits access to the socket 143s as shown in FIG. 7. When the disconnect switch assembly 30 (i.e., breaker) is in the ON position, the shutter 75 slides to the right or left to a closed position which blocks access to the lead screw 143 and socket 143s as shown in FIG. 8 (shown as slid left to block access with the shutter portal 75p to the left of the lead screw 143 but a right to close or block sliding direction may be used).

Figure 9A:
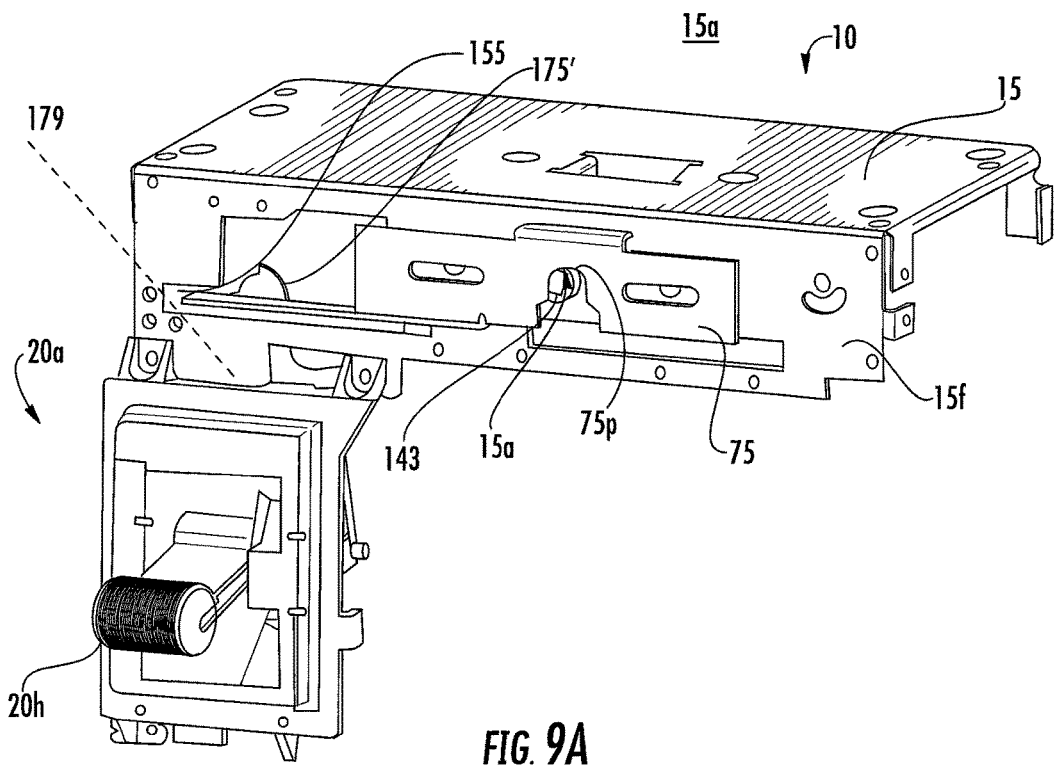
FIG. 9A is a front perspective view of a portion of a unit showing a sliding shutter and a vertically operational handle lever according to embodiments of the present invention.

FIG. 9A illustrates that the shutter 75 can be parallel to the partial front wall 15f. The lead screw 143 can extend out of an aperture 15a in the partial front wall 15f. The partial front wall 15f can have at least one horizontally extending gap space or slot 155 that allows the shutter 75 to slide right and left in response to rotation of a shutter cam 175 (FIGS. 9B, 10-13). The partial front wall 15f also has a portal 143p for the lead in screw 143 (FIGS. 7 and 8, for example).

Figure 9B:
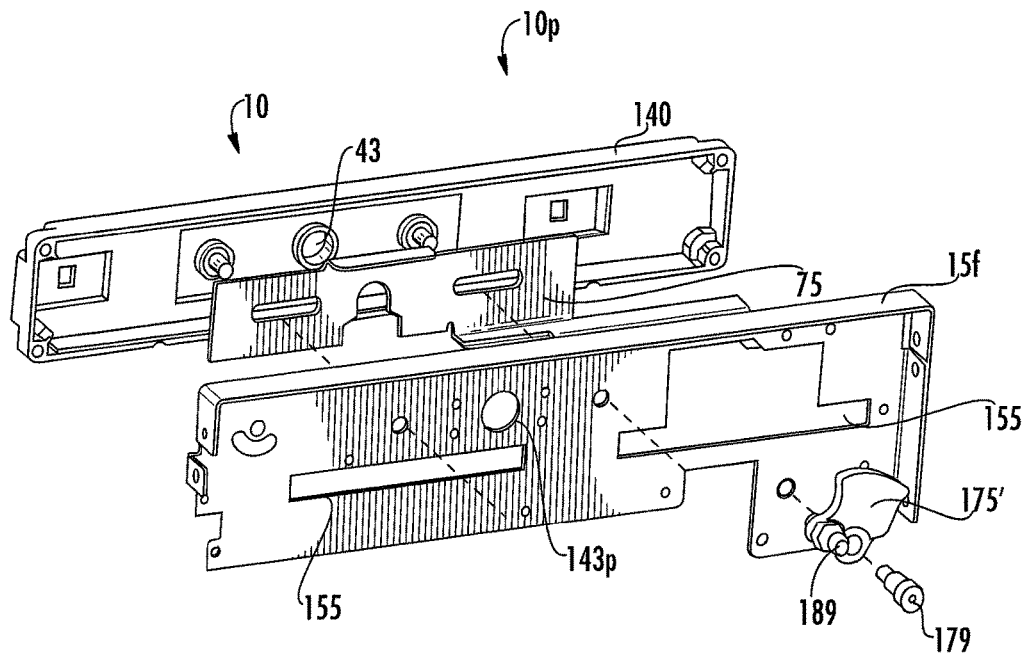
FIG. 9B is a partial back perspective exploded view of a top plate assembly for the unit shown in FIG. 9A according to embodiments of the present invention.

FIG. 9B shows a top plate sub-assembly 10p with the shutter cam 175' attached to the partial front wall 15f, which is behind the shutter 75, which is behind a front cover panel 140 with an external access portal 43. The shutter cam 175' is shown with the upper attachment member 189 can extend horizontally outward behind the partial front wall 15f and shutter cam 175' in this embodiment.

Figure 11:
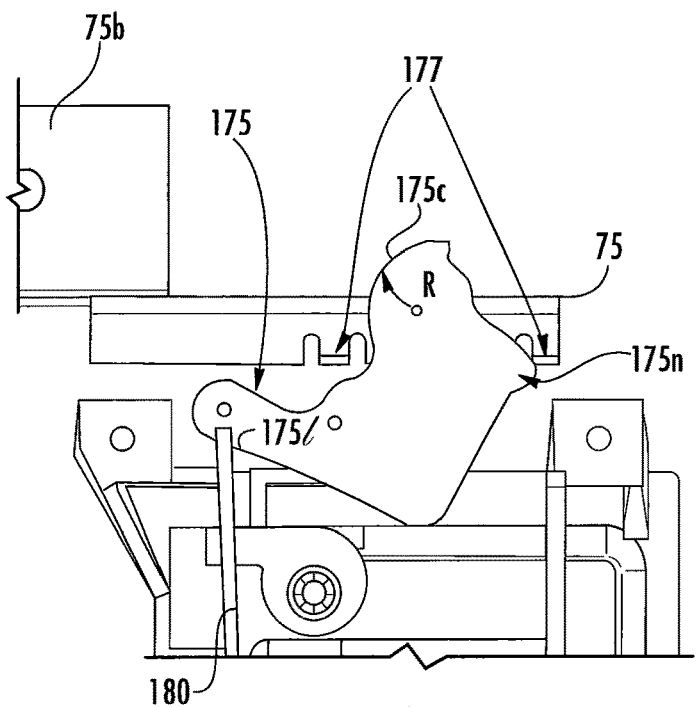
FIG. 11 is a rear view of the assembly shown in FIG. 10.

A rear view of the handle 20h and shutter 75 in the OFF state is shown in FIG. 10. The position of the shutter 75 is controlled by the position of the handle lever 20h by a shutter linkage 180 that drives a rotating shutter cam 175. As the handle lever 20h rotates, the linkage 180 pulls or pushes the shutter cam 175 which rotates and contacts one of the right or left shutter tabs 177 as shown in FIGS. 10 and 11. Depending upon the shutter cam 175 rotation direction. the shutter 75 is pushed towards either the open or closed position (right or left or left or right). The shutter linkage 180 can comprise a straight rod or pin and can be attached to a handle link 185, such as a planar clamp or other link segment or member attached to the handle shaft 21.

The lower end portion of the shutter linkage 180 can be attached to a handle assembly link 185. The handle assembly link 185 can project inward a distance on one side of the shaft 21 (opposite the side holding the cam 24 that engages the linkage 26) and each can reside on opposing end portions of the shaft 21. The shutter cam 175 can be parallel to the primary body 75b of the shutter 75 that holds the portal 75p. The shutter cam 175 can have a leg 175l that is attached to the upper end of the handle assembly linkage 180. The handle assembly linkage 180 can be a plate or planar shaped member that is orthogonal to the shutter cam plate 175p.

Figure 13:
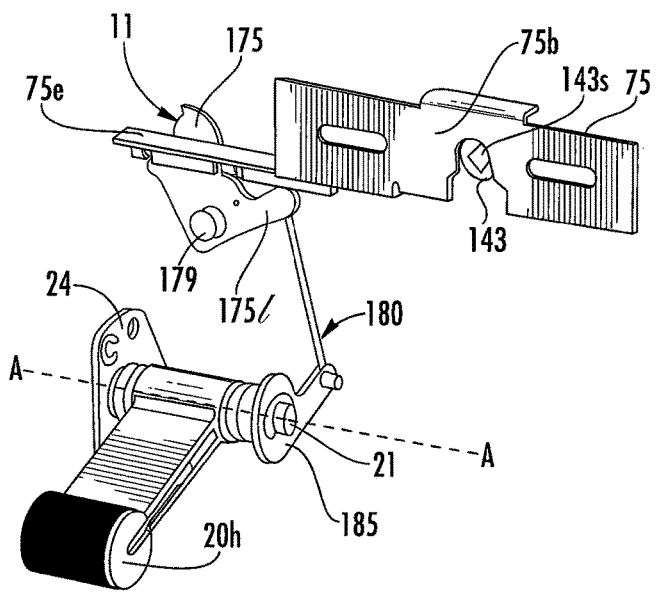
FIGS. 13-15 are front perspective views similar to FIG. 12 but do not show the handle cover/housing to illustrate components of the shutter assembly and movements of certain components according to embodiments of the present invention.
Figure 14:
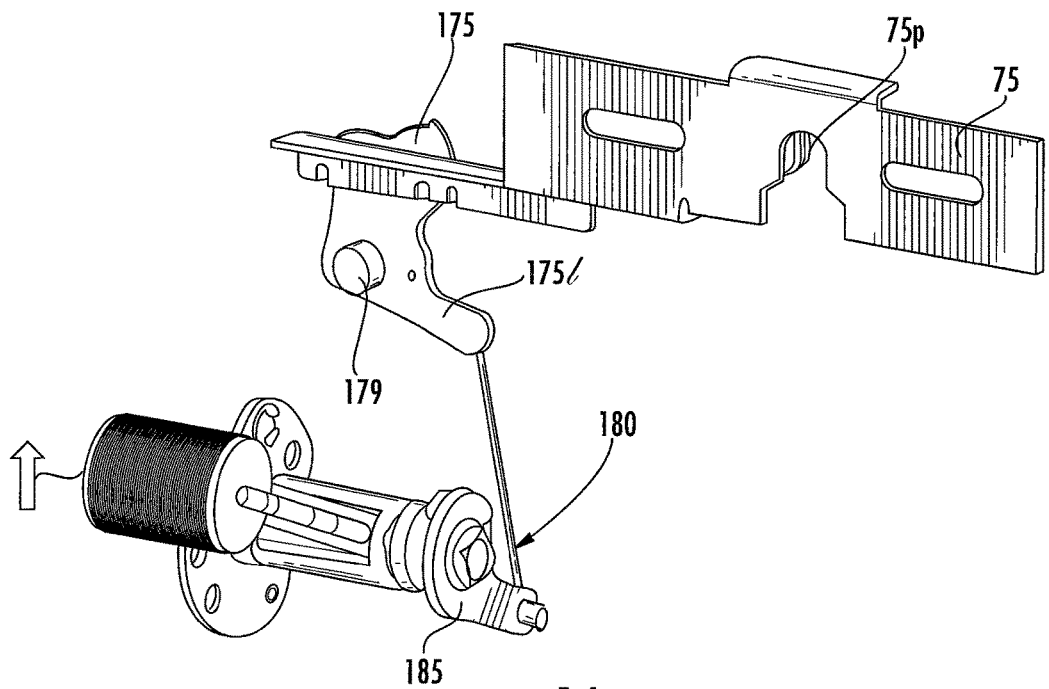
Figure 15:
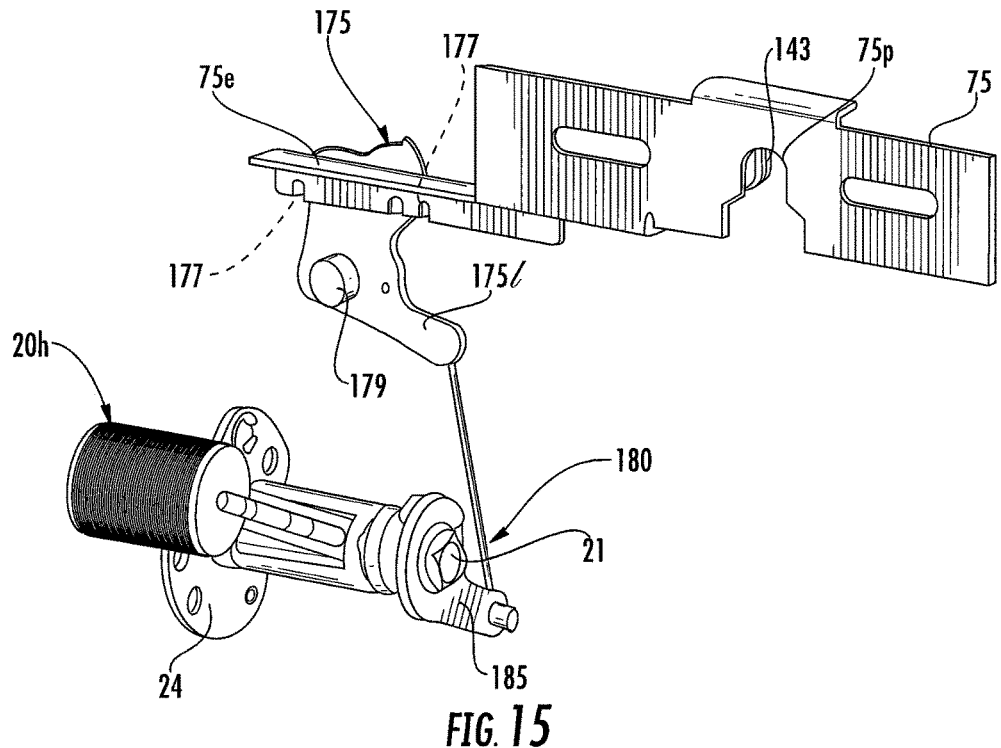
Figure 18:
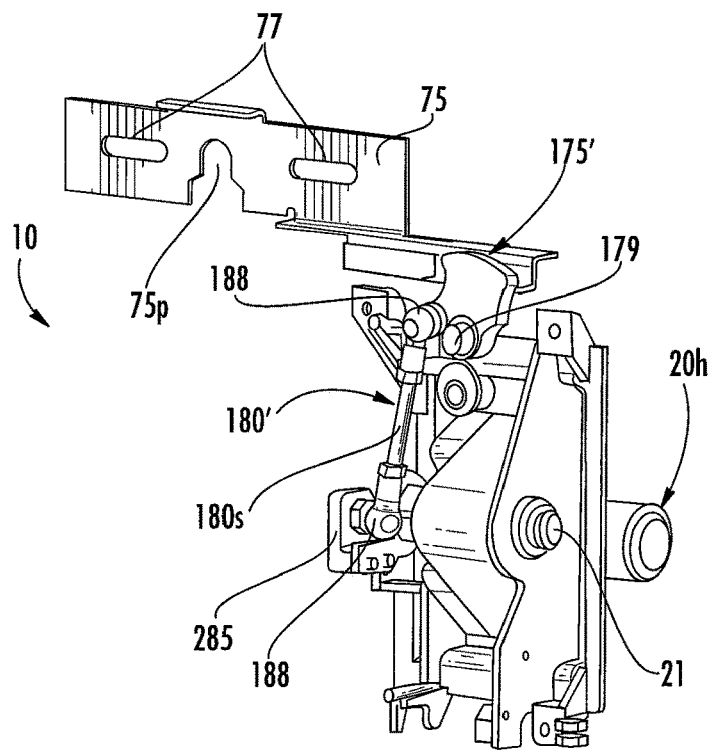
FIG. 18 is a front perspective view of a portion of a unit showing a sliding shutter and a vertically operational handle lever according to embodiments of the present invention.
Figure 19:
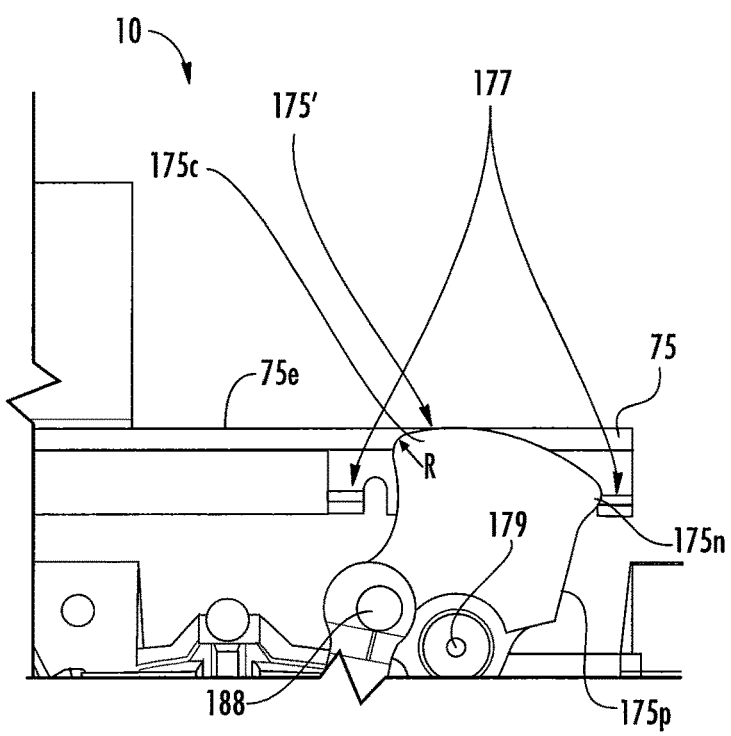
FIG. 19 is a rear view of a portion of the shutter assembly shown in FIG. 18 according to embodiments of the present invention.
Figure 20:
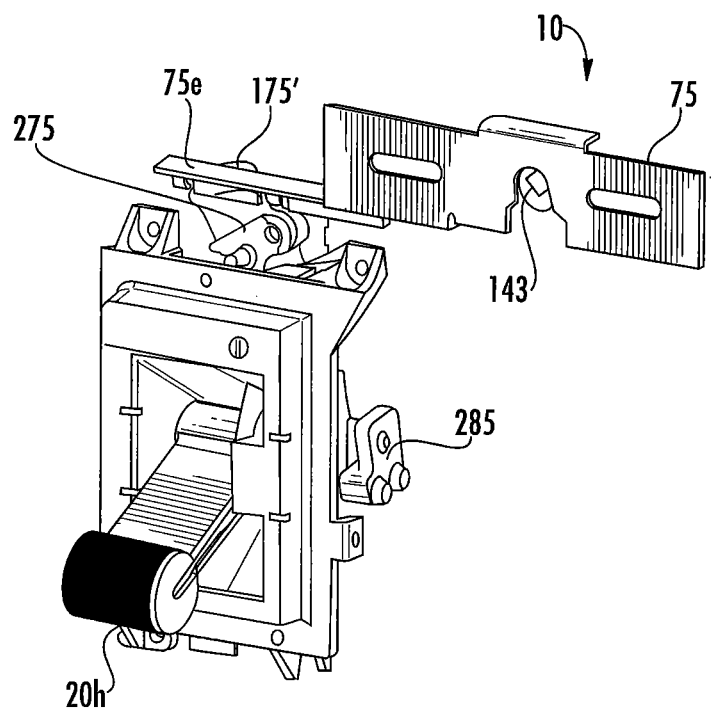
FIG. 20 is a front side perspective view of a portion of a unit showing the handle lever and shutter assembly of FIG. 18 according to embodiments of the present invention.

As shown in FIGS. 13-15, the shutter cam 175 can be attached to the downwardly extending partial front wall 15f (FIGS. 3, 7, 8 and 9) via at least one attachment member 179 that allows the pivoting/rotation motion of the shutter cam 175, 175' (FIG. 18). The attachment member 179 can be a shoulder screw, for example. The attachment member 179 can attach the shutter cam 175 to the partial front wall segment 15f at a position that is below the shutter 75 and to one side of the shutter portal 75p.

Figure 12:
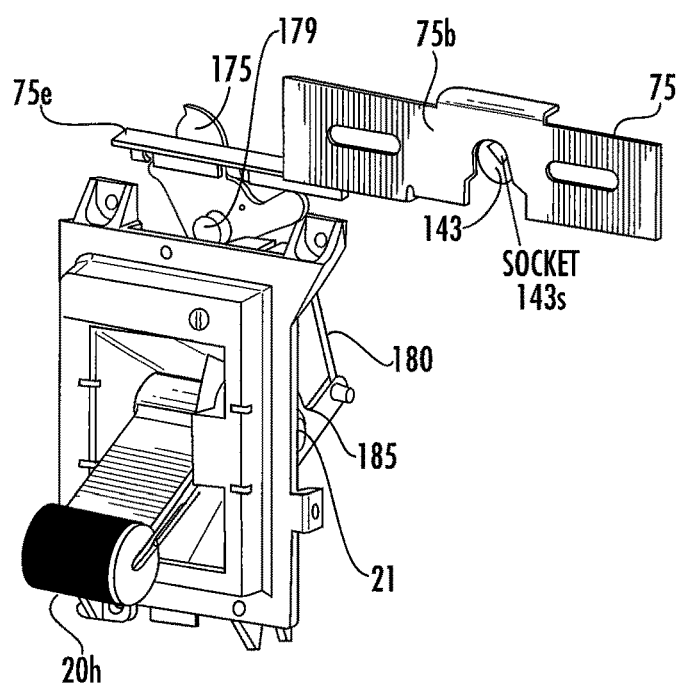
FIG. 12 is a front side perspective view of a portion of a unit showing the handle lever and a shutter assembly according to embodiments of the present invention.

The shutter 75 can have at least one lateral extension 75e that extends off a respective side of the shutter primary body 75b (shown as the left side in FIGS. 12 and 13). The extension 75e can comprise laterally spaced apart tabs 177 that can serially engage different perimeter segments of the shutter cam 175 to move the shutter right and left. The extension can have a height that is much less (50% to 90% less) than the height of the primary body 75b and may extend a distance below the primary body 75b as shown. The tabs 177 are shown as extending inward into the unit and the shutter cam 175 is shown as residing behind the shutter 75 but other arrangements can be used. For example, the shutter 75 or extension thereof 75e can reside in back of the shutter cam 175 and the tabs 177 can project forward.

FIGS. 18-24B (and 9B) illustrate another embodiment of the shutter cam 175' and handle assembly 20a attached to the shutter cam 175'. In this embodiment, the shutter cam 175' has a perimeter profile with a curved segment 175c and a spaced apart peak segment or node segment 175n. The curved segment 175c can contact a first tab 177 to push the shutter 75 in one direction and the peak or node segment 175n can contact a different second and laterally spaced apart tab 177 to push the shutter 75 in the other opposing direction. The curved segment 175c can have the same or a different radius of curvature as the peak or node segment 175n.

The shutter cam 175' can be planar and extend parallel to the primary body of the shutter. A second planar support member 275 having a height less than that of the shutter cam can be attached to the shutter cam 175'. The support member 275 can face the handle 20h and can reside a distance beneath the extension 75e.

The linkage 180' can comprise a shaft segment 180s that merges into opposing shaft couplers 188 at each opposing end.

Referring to FIGS. 23A, 23B, 24A and 24B, the shaft coupler 188 at the lower end can be attached to a bracket 285 that extends inward a distance from a planar link 185. The link 185 can comprise a planar plate that extends at least partially about an internally facing end portion of the shaft 21 of the handle 20h. The plate can have a segment 186 (FIGS. 24B, 26) that extends further into the unit housing that the segment about the shaft 21 to hold a bracket 285 and/or end portion of the linkage 180, 180', shown as holding coupler 188. The shaft coupler 188 rotates with the handle 20h via an extension of the link 185 and/or a bracket 285 attached to the link 185, which translates the shaft 180s and moves the shutter cam 175'.

Figure 24A:
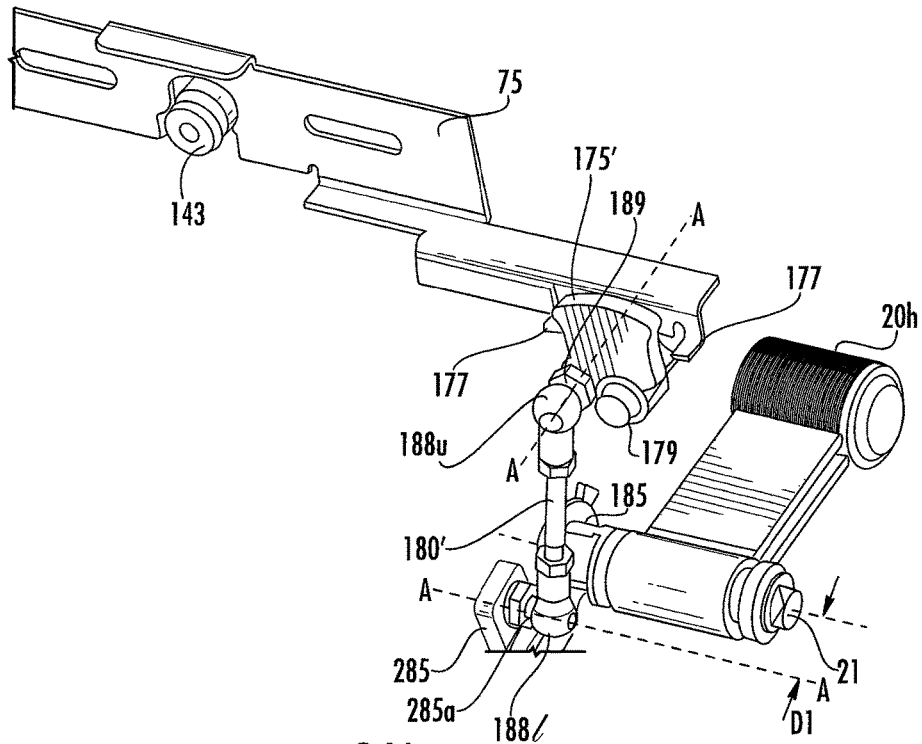
FIGS. 24A and 24B are rear partial views of the shutter cam assembly shown in FIGS. 23A and 23B illustrating another exemplary position and orientation of the shutter cam according to embodiments of the present invention.
Figure 24B:
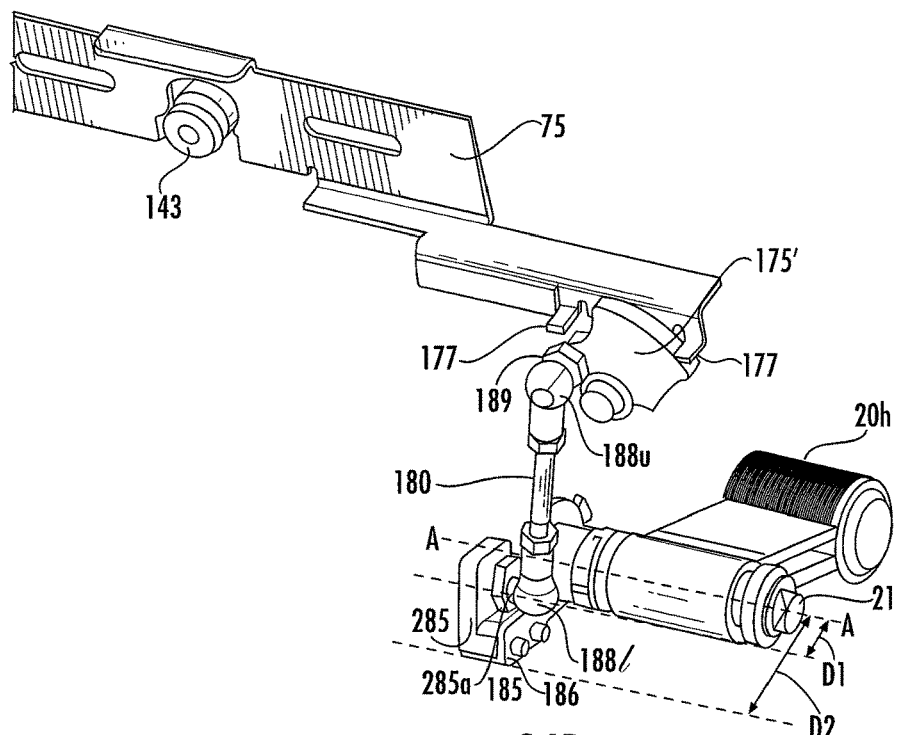

Referring to FIGS. 24A and 24B, the axis of attachment A-A of the lower shaft coupler 188l via attachment member 285a to the bracket 285 can be parallel to the shaft axis A-A. The axis of attachment A-A of the upper shaft coupler 188u to the shutter cam 175' via attachment member 189 can be in a direction toward the handle 20h, optionally perpendicular to the linkage shaft 180s and/or the longitudinal axis of the shaft 21. The attachment members 285a, 189 can be ball joints.

Figure 24C:
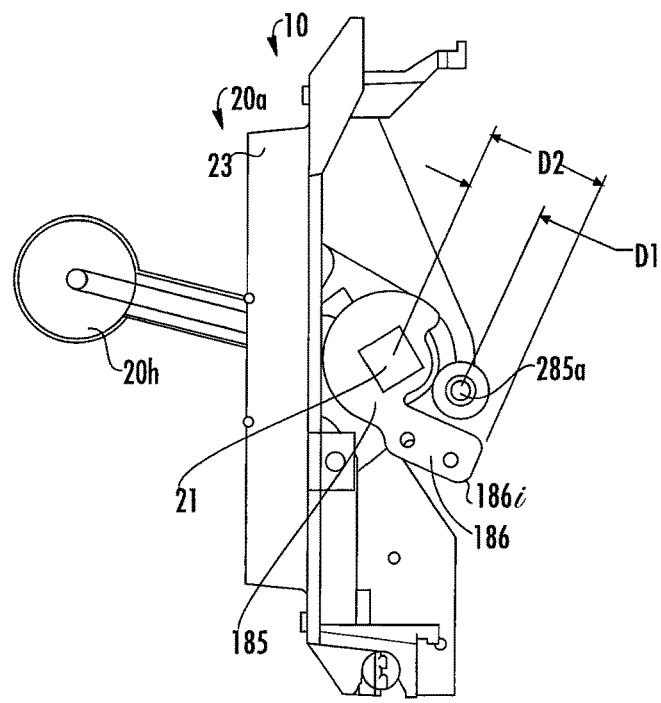
FIG. 24C is a partial section side view of the handle assembly shown in FIGS. 24A and 24B to illustrate exemplary dimensional relationships for the handle shaft and lower link attachment member and link bracket according to some embodiments of the present invention.

Referring to FIGS. 24A-24C, the longitudinal axis A-A of the laterally extending shaft 21 attached to the handle 20h can be spaced apart a distance $D_1$ from the parallel laterally extending centerline of the bracket attachment member 285a. The distance $D_1$ can be a distance from about 0.1 inches to about 1.5 inches, in some embodiments, more typically between 0.5 inches a 1 inch, such as about 0.800 inches. The handle assembly link 185 (i.e., plate) and/or bracket 285 can have an innermost end segment 186i that has a maximal length distance $D_2$ of from 0.5 inch to 3 inches measured from the laterally extending centerline of the shaft 21, more typically between 1 inch and 1.5 inches, such as about 1.250 inches.

Figure 21:
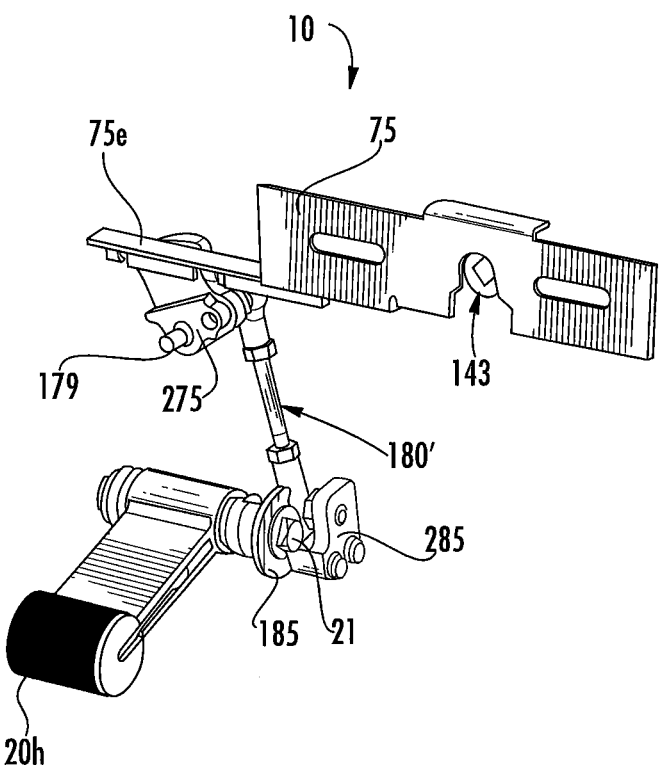
FIGS. 21 and 22 are front perspective views similar to FIG. 20 but do not show the handle cover/housing to illustrate components of the shutter assembly and movements of certain components according to embodiments of the present invention.

OFF-to-ON:

An exemplary OFF position of the handle 20h is shown in FIGS. 12 and 13 and 20 and 21. FIGS. 13 and 21 have the handle cover plate (i.e. housing) 23 and other parts removed for ease of illustration. As the handle lever 20h rotates from the OFF position towards the ON position, the shutter linkage 180, 180' pulls down on the shutter cam 175, 175' which rotates and contacts the shutter tab 177 which pushes the shutter 75 towards the closed position. If the handle 20h rotates far enough, the lever 35 (FIG. 3) rotates to the ON position of the disconnect switch assembly 30 and the shutter 75 slides to the closed position which moves the shutter portal 75p to misalign with the lead screw 143 and blocks access to the socket 143s as shown in FIGS. 14 and 22.

Figure 22:
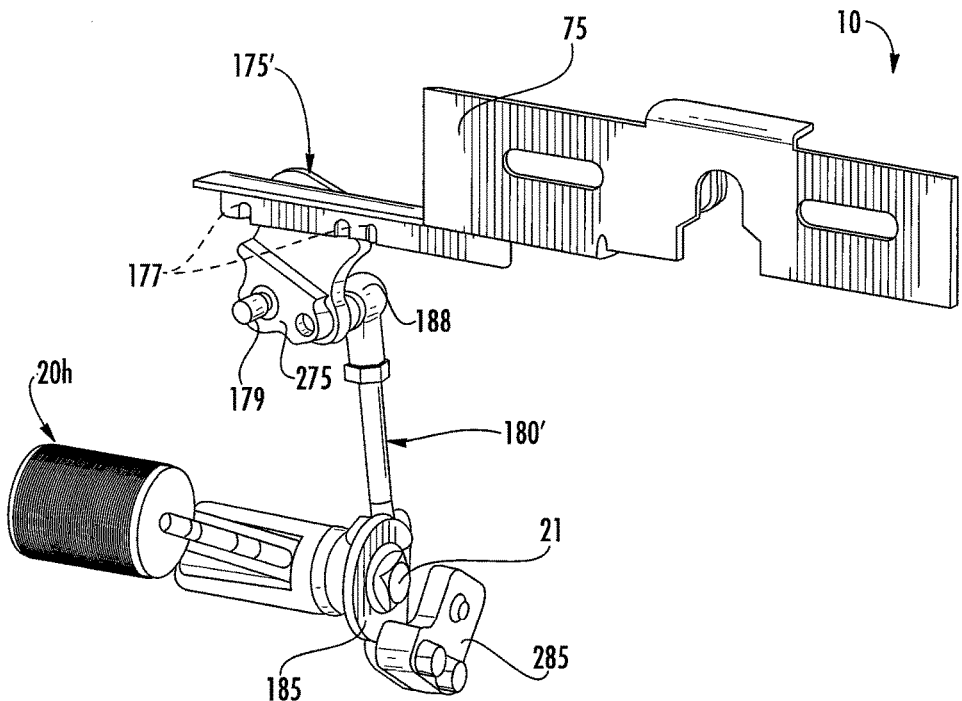
Figure 23A:
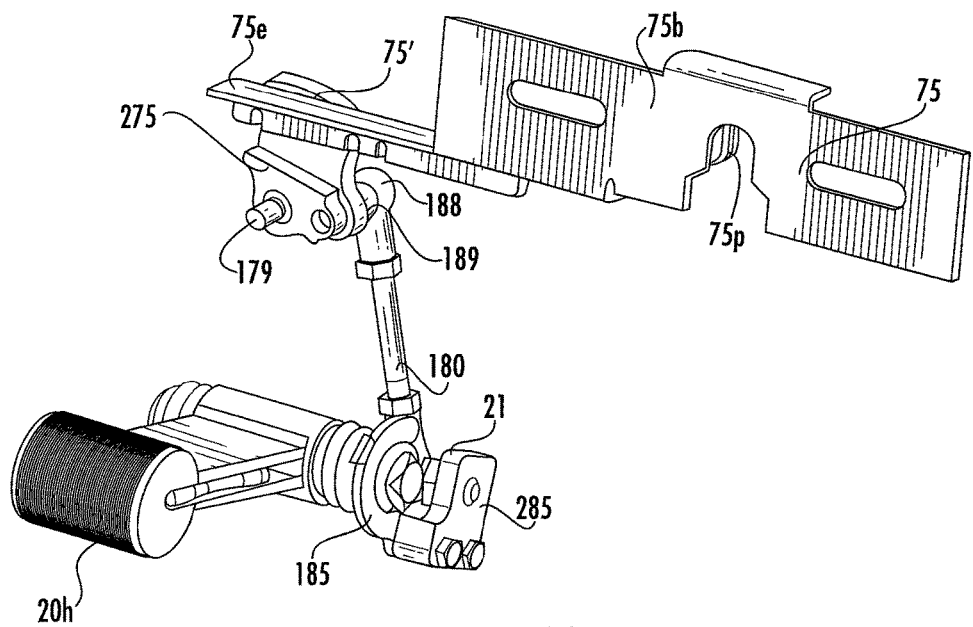
FIGS. 23A and 23B are front partial views of the shutter cam assembly shown in FIG. 18 illustrating an exemplary position and orientation of the shutter cam in according to embodiments of the present invention.
Figure 23B:
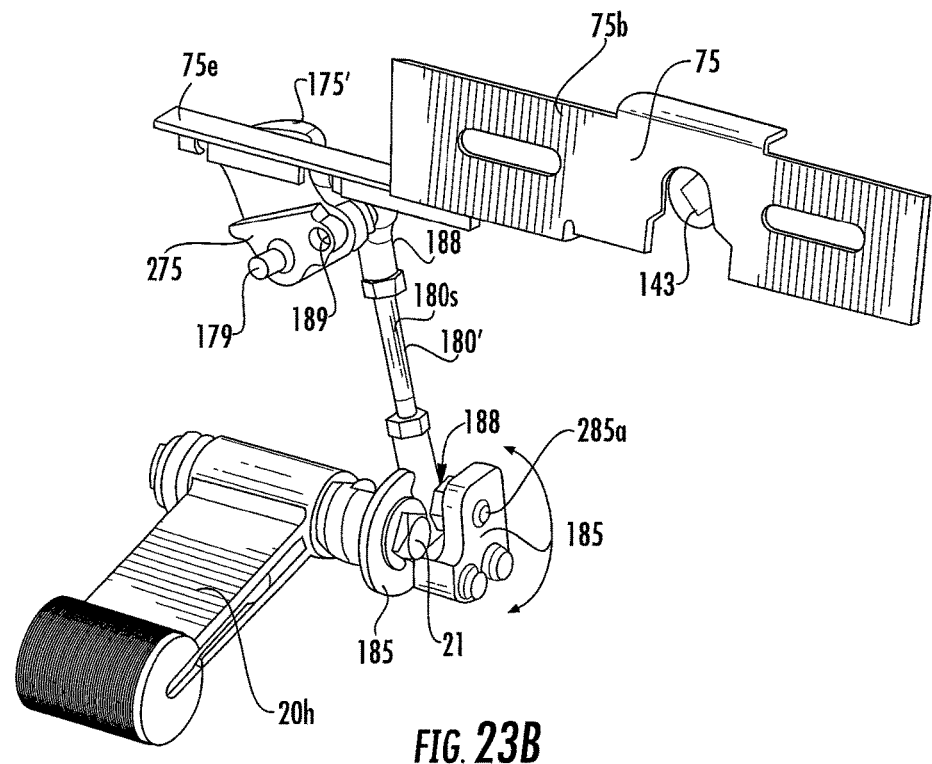

ON-to-OFF:

As the handle 20h rotates from the ON position towards the OFF position, the shutter linkage 180, 180' pushes the shutter cam 175, 175' which makes contact with the other shutter tab 177 which pushes the shutter 75 towards the open position as shown in FIG. 15 and FIG. 22. If the handle 20h rotates far enough, the lever 35 (FIG. 3) rotates to the OFF position and the shutter 75 slides to the open position and allows access to the socket 143s as shown in FIGS. 12, 13, 20 and 21 with the shutter portal 75p over the socket 143s and lead screw 143.

Figure 16:
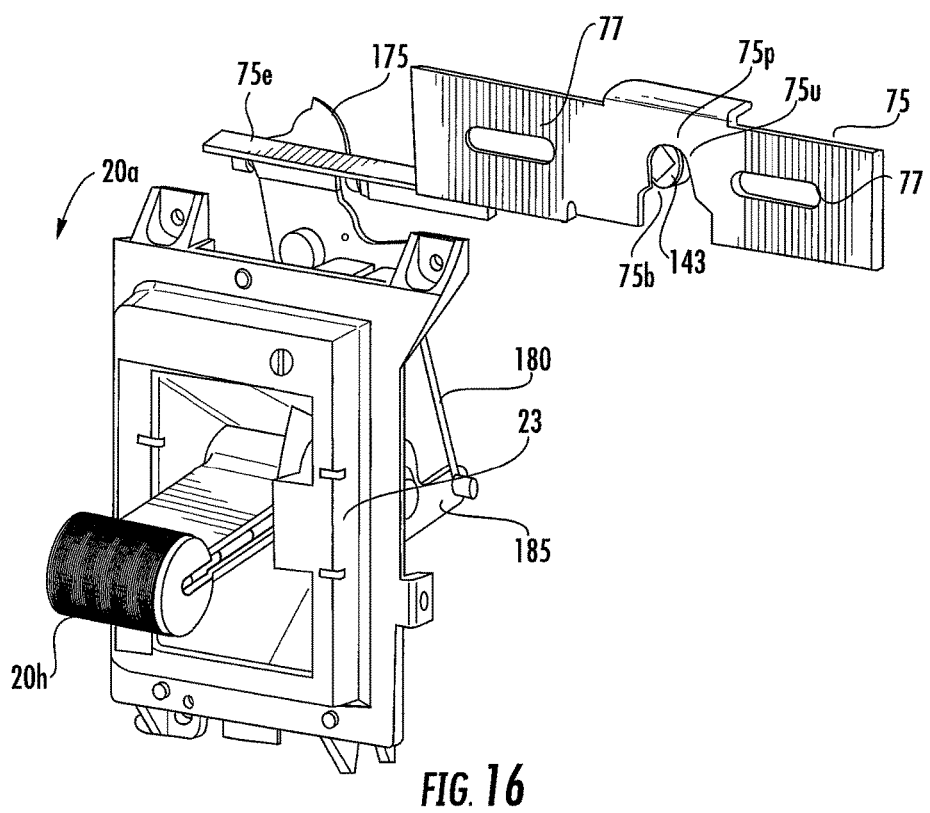
FIG. 16 is a front perspective view of the assembly shown in FIG. 12 but showing a TRIP configuration of certain components and a position of the shutter according to embodiments of the present invention.
Figure 25:
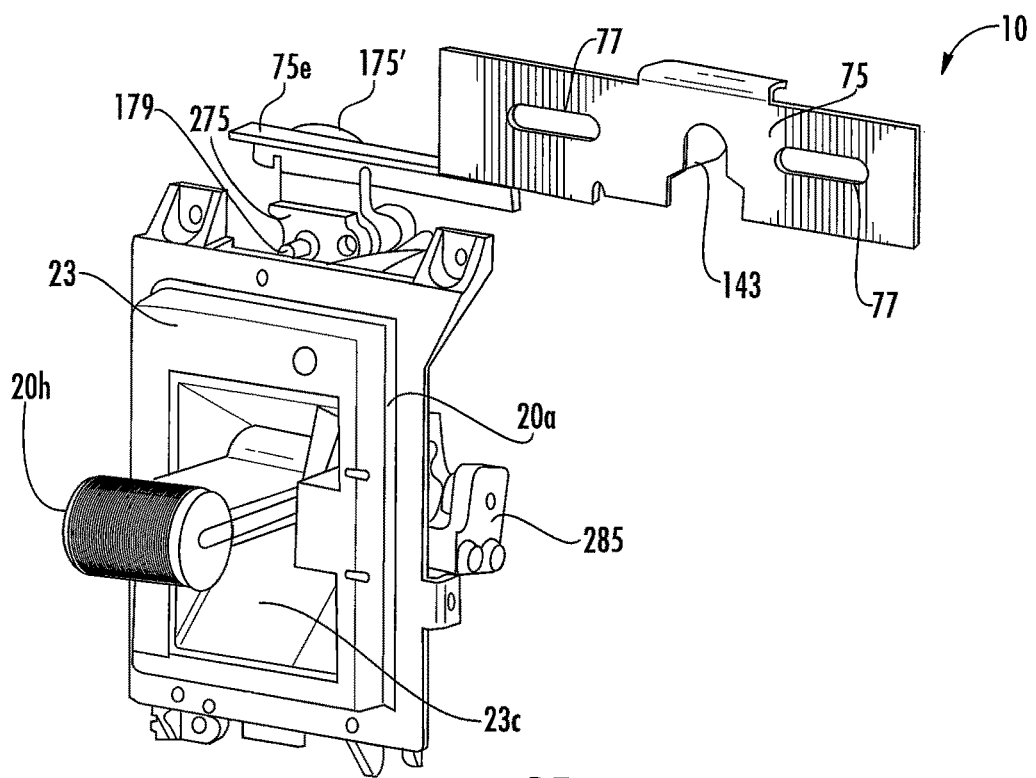
FIG. 25 is a front perspective view of the assembly shown in FIG. 20 but showing a TRIP configuration of certain components and a position of the shutter according to embodiments of the present invention.

ON-to-TRIP:

If the breaker 30c is in the ON position and trips, then the handle lever 20h moves about halfway between the ON and OFF position and the shutter 75 slides to a partially open position where the shutter portal 75p is partially over the lead screw 143 as shown in FIG. 16 and FIG. 25 (the center of the shutter portal is off center from the socket 143s) but a portion of the perimeter of the socket may be exposed through the shutter portal 75p.

The shutter portal 75p can have an arcuate upper end portion 75u that merges into a wider open space 75b at a bottom thereof and the perimeter shape of the portal may have sidewalls that are parallel and straight at the bottom end portion under the arcuate upper portion. The shutter may include elongate horizontal slots 77 that attach to the front partial wall 15f.

Referring to FIGS. 11, 17A, 17B, 23A and 23B, the shutter cam 175 can be a plate 175p that is parallel to the primary body of the shutter 75b. The plate 175p can be planar and can have a cam perimeter profile that is curvilinear. As shown, in some particular embodiments, the cam perimeter profile comprises an upper portion with a curved segment 175c with a radius of curvature "R" (FIG. 11) and a spaced apart peak or node segment 175n. The curved segment 175c can have an angular extension a of about 15-180 degrees measured from a center defining a radius of curvature for an arc, more typically between about 20-135 degrees, in some embodiments. The curved and the peak or node segments 175c, 175n can both reside above the tabs 177 and/or above the segment that is attached to the linkage 180. However, it is contemplated that other cam perimeter profiles and attachment configurations may be used and that the leg is not required.

Figure 17A:
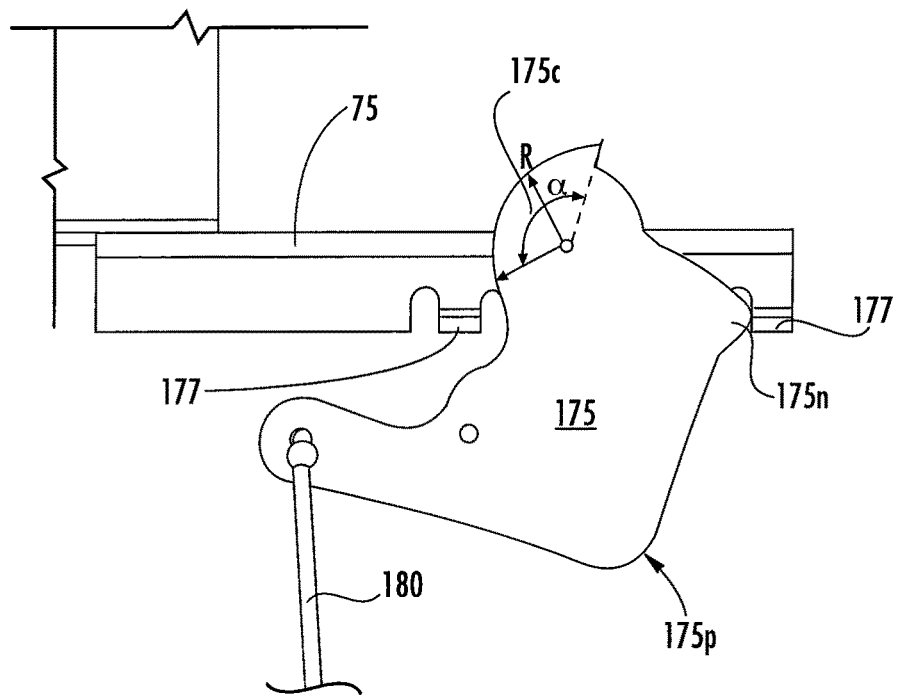
FIGS. 17A and 17B are rear partial views of the shutter assembly shown in FIG. 11 illustrating positions and orientation of the shutter cam in OFF and ON positions according to embodiments of the present invention.
Figure 17B:
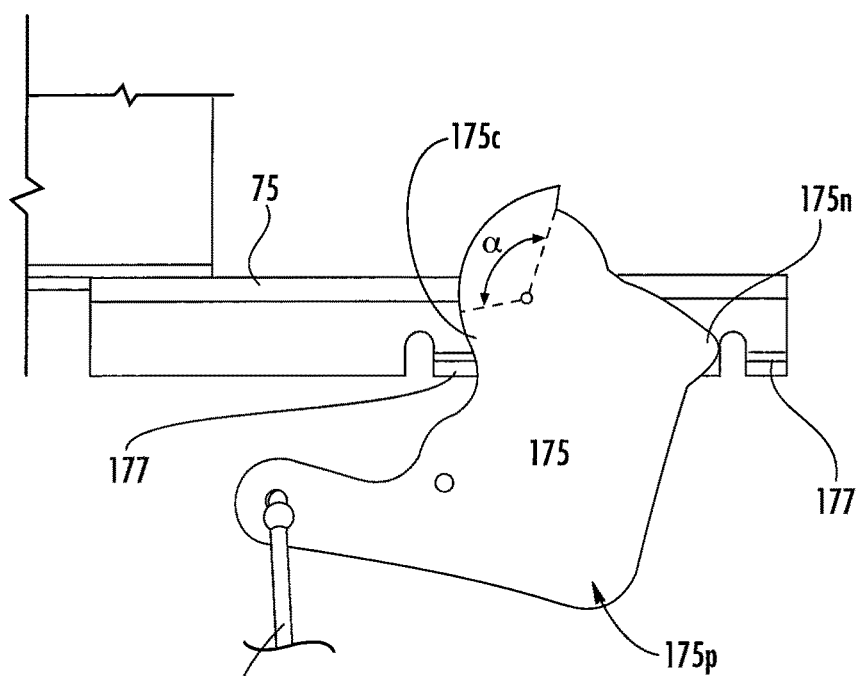

FIG. 17A and FIG. 24B illustrate that in one position, the peak or node segment 175n contacts an adjacent tab 177 and the curved segment 175c is above and spaced apart with the other tab 177 adjacent to it. FIGS. 17B and 24A illustrate that in another position, the peak or node segment 175n is spaced apart for the tab adjacent to it while the curved segment 175c contacts the tab 177 adjacent to it. FIGS. 17A, 24B can be associated with a position corresponding to when the handle 20h is down and "OFF" and FIGS. 17B, 24A can be associated with a position corresponding to when the handle 20h is up and "ON" is down according to particular embodiments. However, other orientations of OFF and ON, right and left positions of the tabs, link positions and cam perimeter profiles may be used.

Figure 26:
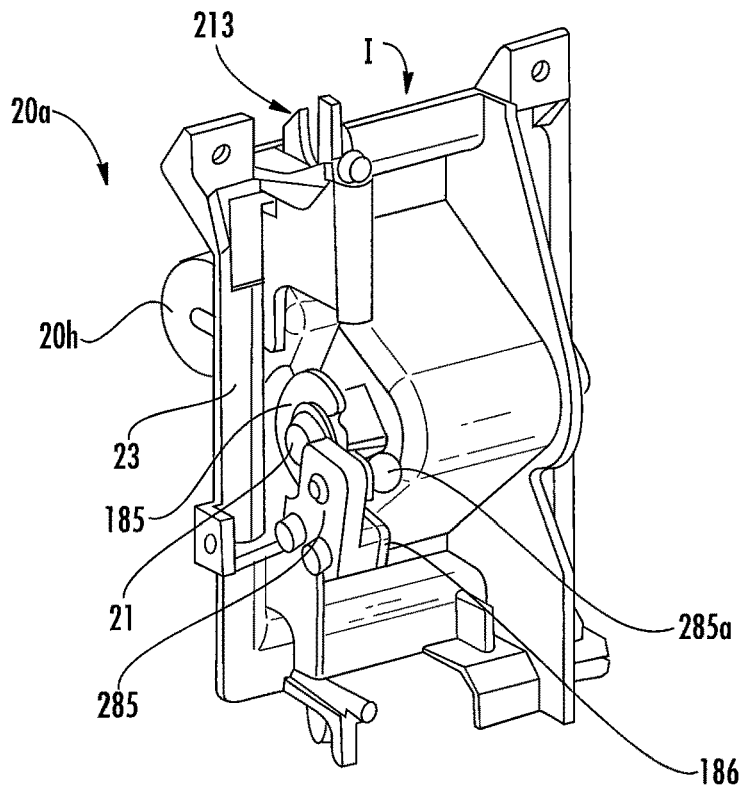
FIG. 26 is a rear view of a handle assembly illustrated with a door interlock and a portion of the shutter cam assembly shown in FIG. 18 according to embodiments of the present invention.

FIG. 26 illustrates a door interlock I that can prevent the breaker 30 and/or unit 10 from being turned ON if the cabinet door is open. The interlock I can be a conventional interlock and may comprise a spring-loaded latch plate 213 that can comprise part of the handle assembly 20a and a door latch that is attached to a door 22 (FIG. 1). When the door 22 is open and the handle lever 20h is in an OFF position, the latch plate 213 is spring-loaded forward to a latched position.

In some embodiments, the bucket assembly 10 can comprise a molded case circuit breaker as the disconnect switch assembly 30. Molded case circuit breakers are well known to those of skill in the art, as exemplified by U.S. Pat. Nos. 4,503,408 and 5,910,760, the contents of which are incorporated herein by reference as if recited in full herein. In other embodiments, the bucket assembly 10 can be configured to house a fused disconnect switch to turn power on and off.

As shown in FIG. 7, for example, the unit 10 can be configured so that the stab S is offset to reside closer to one side of the unit, e.g., so that a left side stab 46 or right side stab 50 (and/or the center stab 48) is closer to a respective left or right side of the unit 10. FIGS. 7 and 8 show the center stab 48 as residing closer to the right side of the unit 10, according to some embodiments.

FIG. 4A illustrates an exemplary "OFF" orientation/position of the handle 20h and lever 35 (shown as both in a down position) while FIG. 4B illustrates an exemplary "ON" position of the handle 20h and lever 35 (shown as in a pivoted up position). The reverse orientations of ON and OFF may also be used. In operation, the pre-defined orientation of the handle 20h with respect to operation status can provide a visual indication to a user-operator of the conduction status of the disconnect circuit assembly 30, e.g., breaker or switch disconnect (optionally with a fuse) being ON/OFF.

The term "ON" with respect to handle position/orientation refers to the associated feeder or starter of the unit 10 having conduction with the operator disconnect closed (circuit breaker closed or fused switch being ON/switch closed). The term "OFF" with respect to handle position/orientation refers to the associated feeder or starter of the unit 10 having no conduction with the disconnect open (circuit breaker open or disconnect switch OFF/switch open).

FIG. 3 illustrates sidewall apertures 13*a* in the sidewalls 13 of the unit 10 which may be used to mount terminal blocks.

FIGS. 7 and 8 also illustrate that, as conventional, the unit 10 can have an interlock L typically via the top surface of the unit.

The lateral stroke distance of the shutter 75 and/or the shutter extension 75*e* in each direction, right to left and/or left to right to open/close the access path to the lead screw 143 can be between about 0.25 inches to about 3 inches, more typically between about 1 inch to about 2 inches.

In some embodiments, the unit 10 can be a dual starter and/or feeder unit and the shutter 75 can engage two handles 20*h* in a single unit 10, and each handle may have a dedicated shutter cam 175, 175' that cooperates with the shutter 75. In some embodiments, two or more separate shutters 75 may be provided, such as one for each handle 20*h*. For example, if the unit is a dual unit, a single shutter can be used. However, if two shutters are used, one can reside in front of the other and independently slide right and left in response to respective handle position 20*h*). In other embodiments, the two shutters can reside in the same plane and laterally move to provide the access and blocking configurations.

Sliding shutter interlocks may also be used, as is conventional, to prevent the shutter from sliding from a portal open to a portal blocked position when the power stabs are in a withdrawn position thereby blocking the handle from moving from the OFF to the ON position.

For fused switch disconnects, the operator mechanism 40 can engage and move a fuse switch lever 35, up and down for ON/OFF operation. Exemplary fuses are FUSETRON™ 600V Class RK5 fuses (BU-SB13729) available from Cooper Bussmann Company, St. Louis, Mo. However, the design is flexible and can accommodate other fuses including those in different classes.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A bucket assembly, comprising:
   a unit housing having a front and opposing laterally spaced apart sidewalls;
   an operator handle facing the front of the unit housing, wherein the operator handle moves vertically between first and second positions;
   a laterally extending shaft attached to the operator handle and residing inside the unit housing;
   an upwardly extending shutter linkage that is attached to the laterally extending shaft;
   a shutter cam attached to the shutter linkage; and
   a shutter in communication with the shutter cam, wherein the shutter has a shutter portal, and wherein the shutter cooperates with the shutter cam to laterally slide the shutter to a position that misaligns the shutter portal with a lead screw to block access to the lead screw when the operator handle is in the second position.

2. The bucket assembly of claim 1, wherein the shutter comprises first and second spaced apart outwardly projecting tabs with the shutter cam positioned therebetween.

3. The bucket assembly of claim 2, wherein the shutter cam has a cam perimeter profile with a curved segment and a spaced apart peak or node segment, and wherein the first tab resides adjacent the curved segment and the second tab resides adjacent the peak or node segment.

4. The bucket assembly of claim 1, wherein the shutter portal has a perimeter shape with an arcuate upper end that merges into a wider open lower end, and wherein the shutter cam is a plate that is held by a laterally extending segment of the shutter and is parallel to a primary body of the shutter.

5. The bucket assembly of claim 1, wherein the shutter has a primary body that merges into a lateral extension with a shorter height than the primary body that comprises first and second outwardly projecting tabs, wherein the unit housing comprises an internal front partial wall that terminates above the shaft of the handle, wherein the shutter cam resides adjacent and between the first and second tabs, wherein a right side of the shutter cam is spaced apart from the first tab while a left side of the shutter cam contacts the second tab to laterally slide the shutter left, and wherein the left side of the shutter cam is spaced apart from the second tab while the right side of the shutter cam contacts the first tab to laterally slide the shutter right.

6. The bucket assembly of claim 5, wherein the shutter cam has an upper end that resides above the first and second tabs and a lower end portion that is pivotably attached to the partial wall behind the partial wall below the tabs.

7. The bucket assembly of claim 1, further comprising a plate that at least partially surrounds the laterally extending shaft and is in a plane that is orthogonal to a longitudinal axis of the laterally extending shaft, wherein the plate has an inner segment that extends into the bucket assembly and holds a bracket that is attached to a lower end of the shutter linkage with an attachment member, and wherein the attachment member has a centerline that is parallel to the longitudinally extending centerline of the shaft, and wherein the attachment member centerline is a distance from 0.25 to 1.5 inches from the longitudinally extending centerline of the laterally extending shaft.

8. The bucket assembly of claim 1, wherein the shutter has a primary body that is planar and vertically oriented that resides in front of a metal partial internal front wall, wherein the primary body has a shorter side extension, wherein the side extension holds laterally spaced apart outwardly projecting first and second tabs, and wherein the shutter cam resides between the first and second tabs.

9. The bucket assembly of claim 1, further comprising a planar plate attached to the laterally extending shaft, and an extension that holds a bracket with an attachment member that attaches the shutter linkage to the bracket, wherein the bracket rotates with the laterally extending shaft as the handle moves up and down to move the shutter linkage that then rotates the shutter cam which moves the shutter laterally.

10. The bucket assembly of claim 1, wherein the shutter cam is a curvilinear plate that is parallel to a primary body of the shutter.

11. The bucket assembly of claim 1, further comprising a support member attached to a primary surface of the shutter cam that resides below outwardly projecting tabs of the shutter, a first fixation member extending through the shutter cam and the support member to attach to a partial front metal wall in the bucket assembly, and a second fixation member extending through the shutter cam and the support member and attached to an upper end portion of the shutter linkage.

12. The bucket assembly of claim 1, further comprising a retractable power stab assembly held by the unit housing to extend and retract power stabs from the rear of the unit, an internal lead screw having a portal that is above the handle adjacent the front panel and extends behind the shutter, wherein the shutter portal slides laterally to block access to the lead screw when the operator handle is in the second position.

13. The bucket assembly of claim 1, further comprising:
 a cam attached to the laterally extending shaft to rotate about a common axis as the operator handle, the cam laterally spaced apart from a handle assembly link also attached to the shaft;
 an inwardly extending linkage having longitudinally opposing spaced apart first and second end portions, the first end portion attached to the cam;
 a pivot plate attached to the second end portion of the linkage, the pivot plate comprising a laterally extending segment that resides behind the operator handle; and
 a switch assembly comprising a lever that engages the laterally extending segment of the pivot plate,
 wherein an upper end portion of a sidewall of the pivot plate is attached to the second end portion of the linkage, and wherein a lower end portion of the sidewall of the pivot plate is slidably attached to a horizontally extending channel held by or formed in a sidewall of a body of the switch assembly.

14. The bucket of claim 1, wherein the shutter has a primary body with a lateral extension with a shorter height than the primary body that comprises first and second outwardly projecting tabs, wherein the internal front partial wall extends down a distance and terminates above the shaft of the handle, wherein the shutter cam resides adjacent and between the first and second tabs, wherein a right side of the shutter cam is spaced apart from the first tab while a left side of the shutter cam contacts the second tab to laterally slide the shutter left, wherein the left side of the shutter cam is spaced apart from the second tab while the right side of the shutter cam contacts the first tab to laterally slide the shutter right, and wherein the shutter cam has an upper end that resides above the first and second tabs.

15. The bucket of claim 1, further comprising a plate that at least partially surrounds the laterally extending shaft and is in a plane that is orthogonal to a longitudinal axis of the laterally extending shaft, wherein the plate has an inner segment with a maximal inwardly extending length that extends into the bucket assembly a distance of from 0.5 inch to 2 inches beyond the longitudinally extending centerline of the shaft, and wherein the inner segment holds a bracket that is attached to the shutter linkage.

16. A bucket, comprising:
 an operator handle that moves vertically up and down between first and second positions;
 a laterally extending shaft residing behind and attached to an inner end portion of the operator handle;
 a cam attached to the shaft to rotate about a common axis as the operator handle;
 an inwardly extending linkage having longitudinally opposing spaced apart first and second end portions, the first end portion attached to the cam;
 a pivot plate attached to the second end portion of the linkage, the pivot plate comprising a laterally extending segment that resides behind the operator handle;
 a switch assembly comprising a lever that engages the laterally extending segment of the pivot plate;
 a metal partial internal front vertical oriented panel;
 a retractable power stab assembly with an internal lead screw and access portal, wherein the lead screw cooperates with a nut to extend and retract power stabs from a rear of the bucket;
 an inwardly extending handle link attached to the shaft laterally spaced apart from the cam;
 an upwardly extending shutter linkage that is attached to the handle link;
 a shutter cam attached to the shutter linkage and the metal partial internal front panel; and
 a shutter in communication with the shutter cam, wherein the shutter has a shutter portal that is aligned with a lead screw when the operator handle is in the first position, and wherein the shutter cooperates with the shutter cam to laterally slide to a position that misaligns the shutter portal with the lead screw to block access to the lead screw when the operator handle is in the second position.

17. The bucket of claim 16, wherein the shutter comprises first and second laterally spaced apart outwardly projecting tabs with the shutter cam positioned therebetween.

18. The bucket of claim 17, wherein the shutter cam has a cam perimeter profile with a curved segment and a spaced apart peak or node segment, and wherein the first tab resides adjacent the curved segment and the second tab resides adjacent the peak or node segment.

19. The bucket of claim 16, wherein the shutter cam is a plate that is parallel to a primary body of the shutter.

20. The bucket of claim 16, wherein the shutter portal has a perimeter shape with an arcuate upper end that merges into a wider open lower end, and wherein the shutter cam is a plate that is held by a laterally extending segment of the shutter and is parallel to a primary body of the shutter.

* * * * *